US012761618B2

(12) United States Patent
Sabolcik et al.

(10) Patent No.: US 12,761,618 B2
(45) Date of Patent: Oct. 13, 2026

(54) IOT MESH WITH ADAPTIVE MANAGEMENT

(71) Applicant: Wangs Alliance Corporation, Port Washington, NY (US)

(72) Inventors: Michael Sabolcik, Leander, TX (US); Suman Minnaganti, Austin, TX (US)

(73) Assignee: Wangs Alliance Corporation, Port Washington, NY (US)

( * ) Notice: Subject to any disclaimer, the term of this patent is extended or adjusted under 35 U.S.C. 154(b) by 3 days.

(21) Appl. No.: 18/114,545

(22) Filed: Feb. 27, 2023

(65) Prior Publication Data

US 2023/0273582 A1 Aug. 31, 2023

Related U.S. Application Data

(60) Provisional application No. 63/313,848, filed on Feb. 25, 2022.

(51) Int. Cl.
*G16Y 40/30* (2020.01)
*G05B 19/042* (2006.01)
(Continued)

(52) U.S. Cl.
CPC ............ *G05B 19/042* (2013.01); *G16Y 10/80* (2020.01); *G16Y 40/30* (2020.01);
(Continued)

(58) Field of Classification Search
CPC ........ G16Y 10/80; G16Y 40/10; G16Y 40/30; G16Y 40/35; G16Y 20/10; H04L 12/2803; H04L 12/2816; H04L 69/18; H04B 47/175
See application file for complete search history.

(56) References Cited

U.S. PATENT DOCUMENTS 10,251,246 B2 4/2019 Shukla et al.
10,488,897 B2 11/2019 Stefankiewicz et al.
(Continued)

FOREIGN PATENT DOCUMENTS

CN 102984039 3/2016
WO WO2017/151682 9/2017

OTHER PUBLICATIONS

D. Hanggoro, L. Rosyidi and R. F. Sari, "Design and Implementation of Multi-Protocol Gateway for Internet of Things, " 2019 IEEE International Conference on Industry 4.0, Artificial Intelligence, and Communications Technology (IAICT), Bali, Indonesia, 2019, pp. 64-69 (Year: 2019).*

(Continued)

*Primary Examiner* — Jason D Recek

(57) ABSTRACT

Apparatus and methods for controlling a fixture are provided. The fixture may include a circuit. The circuit may include a radio. The radio may be configured to transmit and receive using one, two or more different protocols. The fixture may be part of an IoT network. The IoT network may include a plurality of one or more fixtures. The fixtures may be in communication with the Internet via a router. The IoT network may be an IoT network that does not include a dedicated multi-protocol gateway as an intermediary between the fixtures and the router. One or more of the fixtures may be designated as a multi-protocol gateway for the IoT network. A fixture that is not designated as the multi-protocol gateway may have communication via one or more of the protocols disabled.

29 Claims, 21 Drawing Sheets

(51) Int. Cl.

| | |
|---|---|
| ***G16Y 10/80*** | (2020.01) |
| ***H04L 12/28*** | (2006.01) |
| ***H04L 69/18*** | (2022.01) |
| *G16Y 20/10* | (2020.01) |
| *G16Y 40/10* | (2020.01) |

(52) U.S. Cl.

CPC ...... *H04L 12/2803* (2013.01); *H04L 12/2816* (2013.01); *H04L 69/18* (2013.01); *G05B 2219/25011* (2013.01); *G05B 2219/25257* (2013.01); *G16Y 20/10* (2020.01); *G16Y 40/10* (2020.01)

(56) References Cited

U.S. PATENT DOCUMENTS

| | | | |
|---|---|---|---|
| 10,511,206 | B2 | 12/2019 | Zhang |
| 10,693,714 | B2 | 6/2020 | Teo et al. |
| 10,791,610 | B2 | 9/2020 | Rumer et al. |
| 10,805,155 | B1 | 10/2020 | Le et al. |
| 10,806,011 | B2 | 10/2020 | Rumer et al. |
| 10,862,313 | B2 | 12/2020 | Davis et al. |
| 11,028,854 | B2 | 6/2021 | Stefankiewicz et al. |
| 11,142,194 | B1 | 10/2021 | Anvari |
| 11,153,750 | B2 | 10/2021 | Altin et al. |
| 11,265,814 | B2 | 3/2022 | Lin et al. |
| 11,477,874 | B2 | 10/2022 | Garcia |
| 11,598,345 | B2 | 3/2023 | Stefankiewicz et al. |
| 2015/0046676 | A1* | 2/2015 | Archibald ............. G06F 9/5083 712/28 |
| 2015/0215808 | A1* | 7/2015 | Karlsson ............... H04W 72/51 370/328 |
| 2015/0351203 | A1 | 12/2015 | Shen et al. |
| 2017/0105176 | A1 | 4/2017 | Finnegan et al. |
| 2017/0134536 | A1* | 5/2017 | Tessiore .................. H04L 69/18 |
| 2017/0374490 | A1* | 12/2017 | Schoppmeier .......... H04L 67/12 |
| 2018/0084627 | A1 | 3/2018 | Recker et al. |
| 2018/0092151 | A1* | 3/2018 | Liu ....................... H04W 24/02 |
| 2018/0295187 | A1 | 10/2018 | Sabata et al. |
| 2018/0324609 | A1* | 11/2018 | Diancin .................. H04L 47/83 |
| 2019/0013960 | A1* | 1/2019 | Sadwick ................ H05B 47/19 |
| 2019/0044831 | A1 | 2/2019 | Guim Bernat et al. |
| 2019/0186496 | A1 | 6/2019 | Montieth et al. |
| 2019/0206231 | A1 | 7/2019 | Armstrong et al. |
| 2019/0320497 | A1* | 10/2019 | Zhuang ............... F21V 33/0052 |
| 2019/0373536 | A1* | 12/2019 | Jayawardene ....... H04B 17/318 |
| 2020/0211364 | A1* | 7/2020 | Kasiviswanathan .......................... G08B 13/19663 |
| 2020/0213823 | A1 | 7/2020 | Elkhail et al. |
| 2020/0403877 | A1 | 12/2020 | Hayes et al. |
| 2021/0067921 | A1 | 3/2021 | Amini et al. |
| 2021/0219237 | A1 | 7/2021 | Lu |
| 2021/0314867 | A1* | 10/2021 | Abou-Rizk ....... H04W 52/0222 |
| 2021/0375491 | A1* | 12/2021 | Chenguttuvan ....... H04L 9/3239 |
| 2021/0385814 | A1 | 12/2021 | Abotabl et al. |

OTHER PUBLICATIONS

Froiz-Míguez I, Fernández-Caramés TM, Fraga-Lamas P, Castedo L. Design, Implementation and Practical Evaluation of an IoT Home Automation System for Fog Computing Applications Based on MQTT and ZigBee-WiFi Sensor Nodes. Sensors (Basel). Aug. 13, 2018;18(8):2660. doi: 10.3390/s18082660 (Year: 2018).*

International Search Report and Written Opinion of the International Searching Authority, Jul. 11, 2023.

* cited by examiner

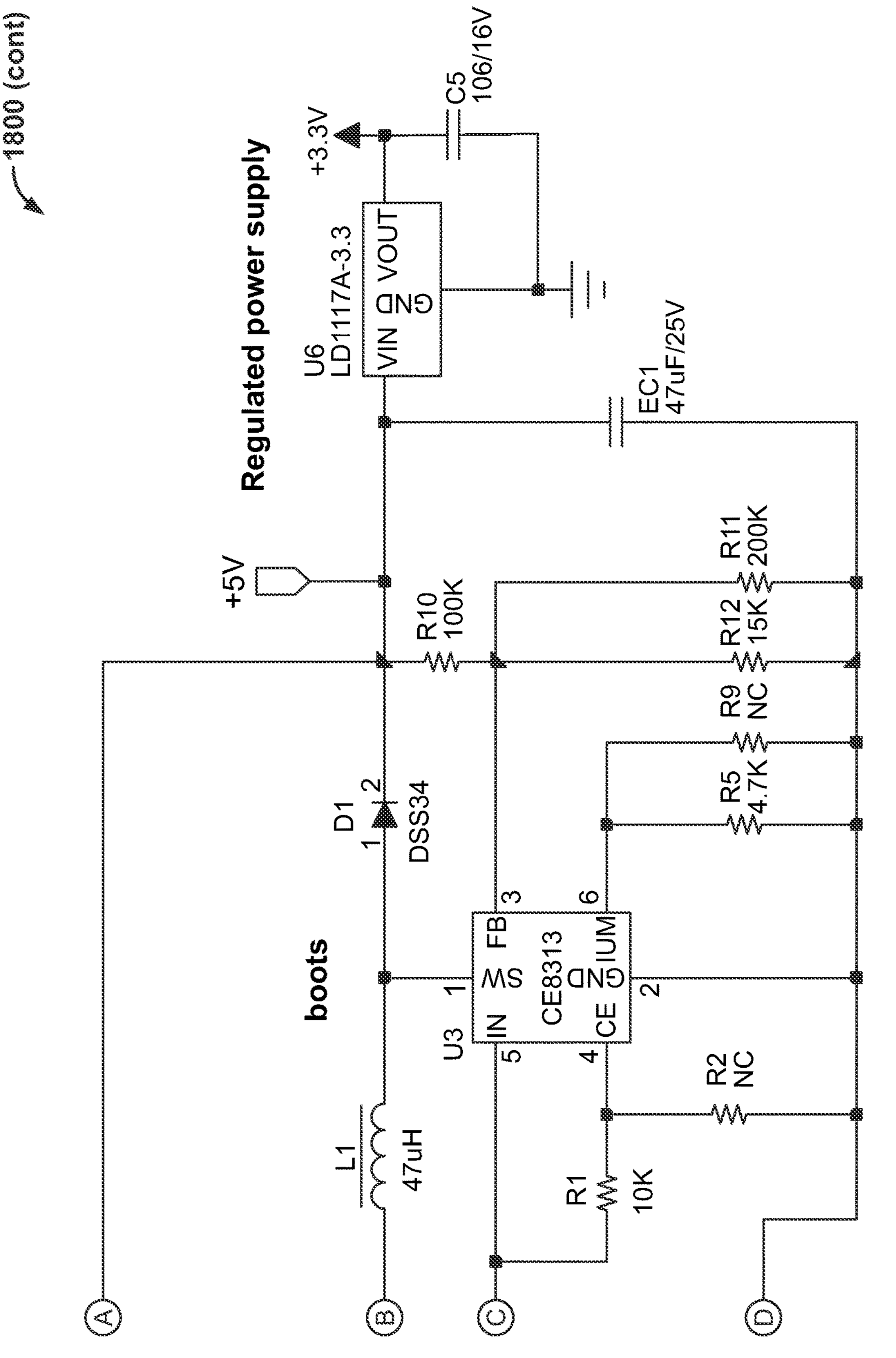
FIG. 18 (Cont-1)

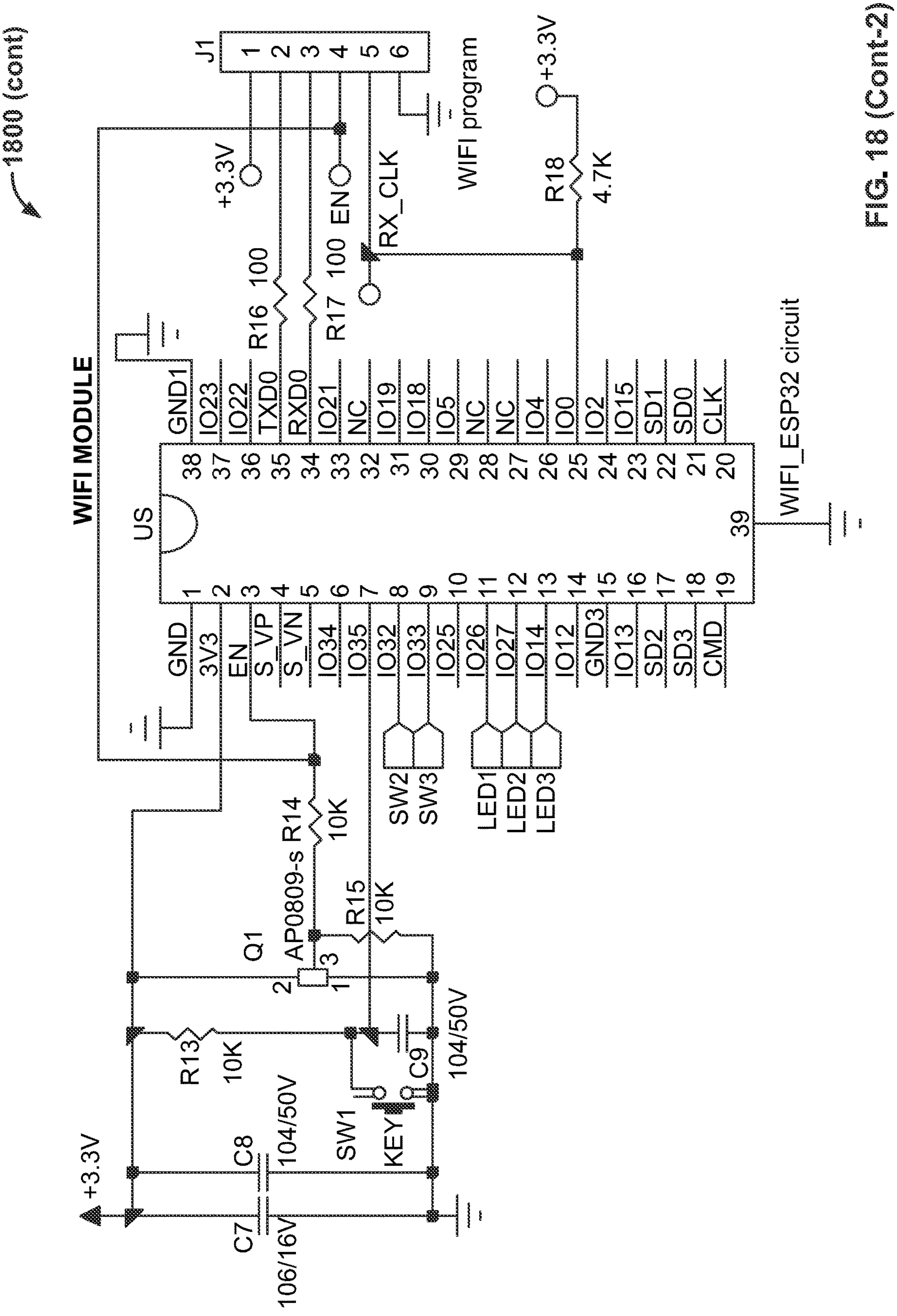
FIG. 18 (Cont-2)

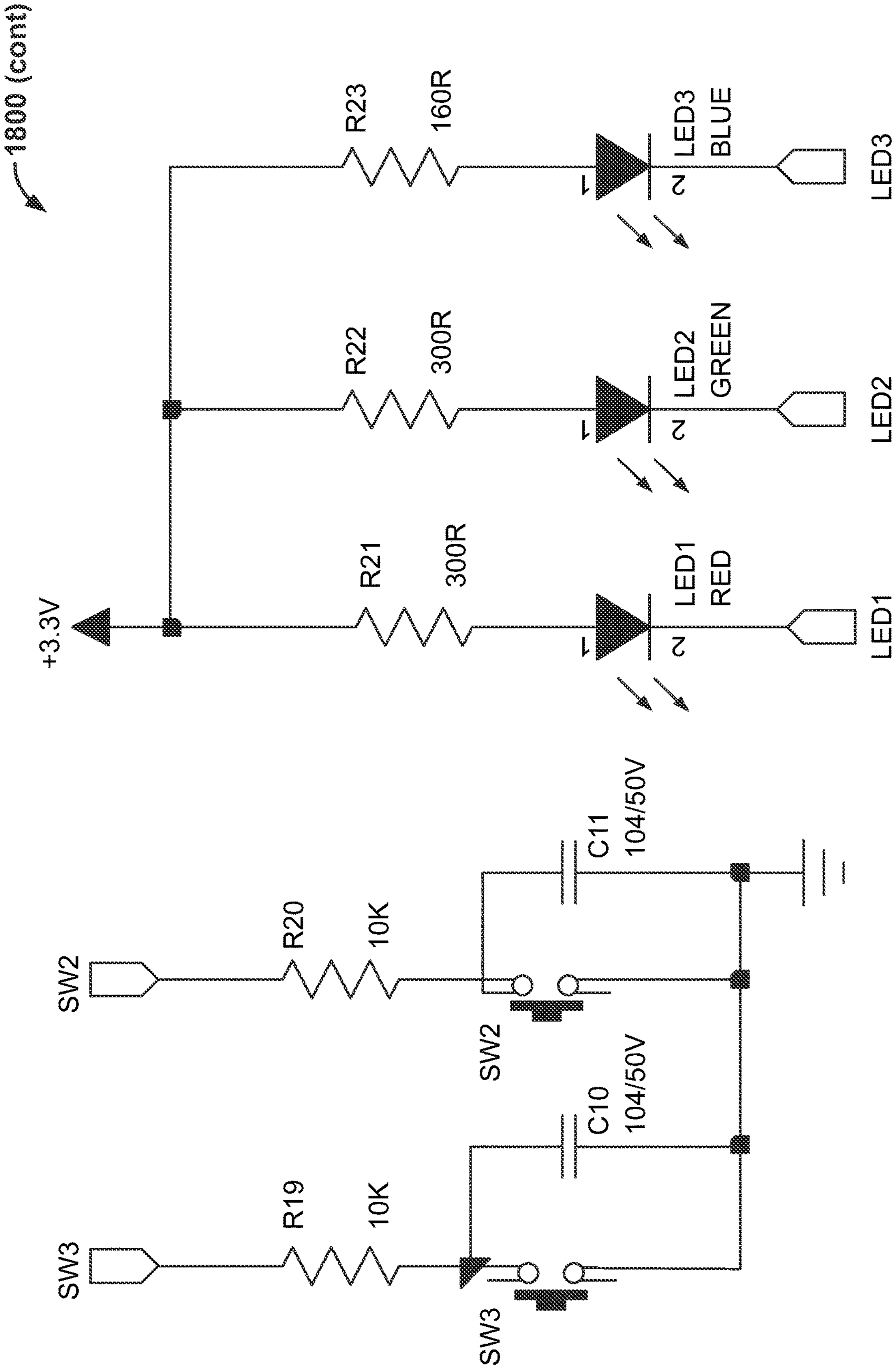
FIG. 18 (Cont-3)

IOT MESH WITH ADAPTIVE MANAGEMENT

BACKGROUND

Home automation IoTM ("Internet of Things Monitoring") products typically use a low power mesh network within the home for connectivity between end devices and a dedicated gateway device that manages communication between the mesh and IP hosts (Local LAN and/or cloud servers, e.g.). Examples of this network are Zigbee, Z-Wave, 6-Low-PAN, etc. These networks do not allow end devices to connect to a cloud infrastructure without a dedicated gateway that arbitrates or manages communication between the cloud and the end devices. A typical end device has a low power mesh radio. A dedicated gateway device manages the communication between the end devices and any Internet Protocol ("IP") based device.

Typically, the dedicated gateway manages scheduling of automations and integration to other control systems.

FIG. 1 shows a dedicated gateway architecture. In the typical architecture, mesh M includes dedicated gateway G and end devices D. All communication between devices D and the router pass through dedicated gateway G. The router communicates with the Wide Area Network.

FIG. 2 shows a dedicated gateway architecture with a dedicated gateway in parallel with a lighting control system. The dedicated gateway interfaces between mesh M and the router. Lighting controllers feed control information into the dedicated gateway for transmission to end-devices in mesh M.

FIG. 3 shows a dedicated gateway architecture along with gauges showing fixture signal strength as measured at dedicated gateway G. The gauges show that signal strength falls off with increasing distance from gateway G.

FIG. 4 shows a dedicated gateway architecture along with gauges showing fixture signal strength as measured at dedicated gateway G. The gauges show that structure S blocks signal strength from end device Do.

Mesh M does not have the versatility to adapt to an end device from which it is difficult to receive a signal.

Examples of typical dedicated gateways include those from Arlo (https://www.arlo.com/en-us/accessories/ABB1000-100NAS.html), Ring (https://ring.com/products/smart-lighting-bridge), and Phillips (https://www.philips-hue.com/en-us/p/hue-bridge/046677458478?origin=p71805997391&gclid=Cj0KCQiAutyfBhCMARIsAMgcRJTqRk72tjbAMMVUL6RYAYj--0SKhVygSVhOe8O_a361QFIPJVGMqyYaAl4yEALw_wcB&gclsrc=aw.ds#overview).

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

Figure 1:
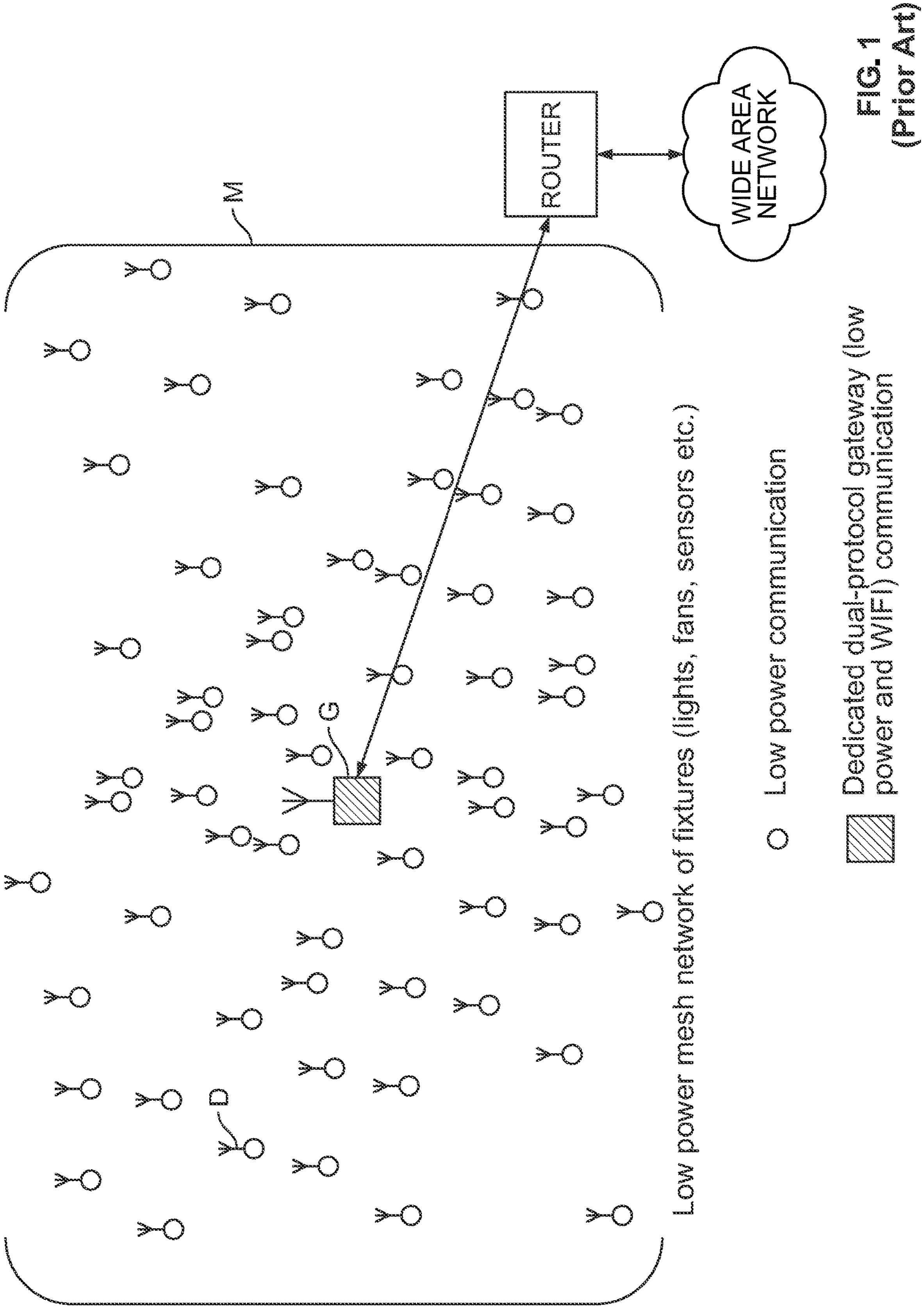
FIG. 1 (Prior Art)
FIG. 1 shows a typical prior art architecture.
Figure 2:
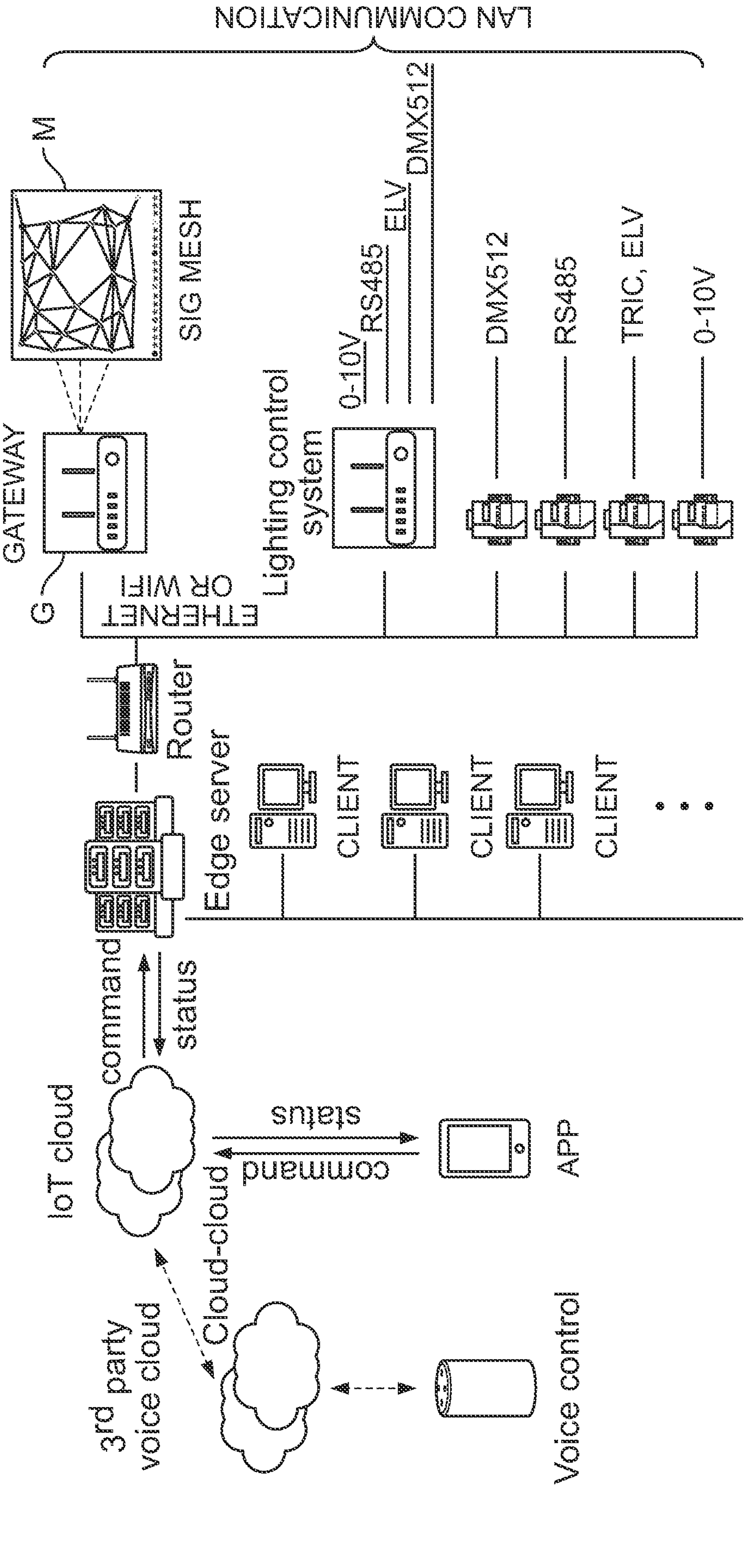
FIG. 2 (Prior Art)
FIG. 2 shows a typical prior art architecture.
Figure 3:
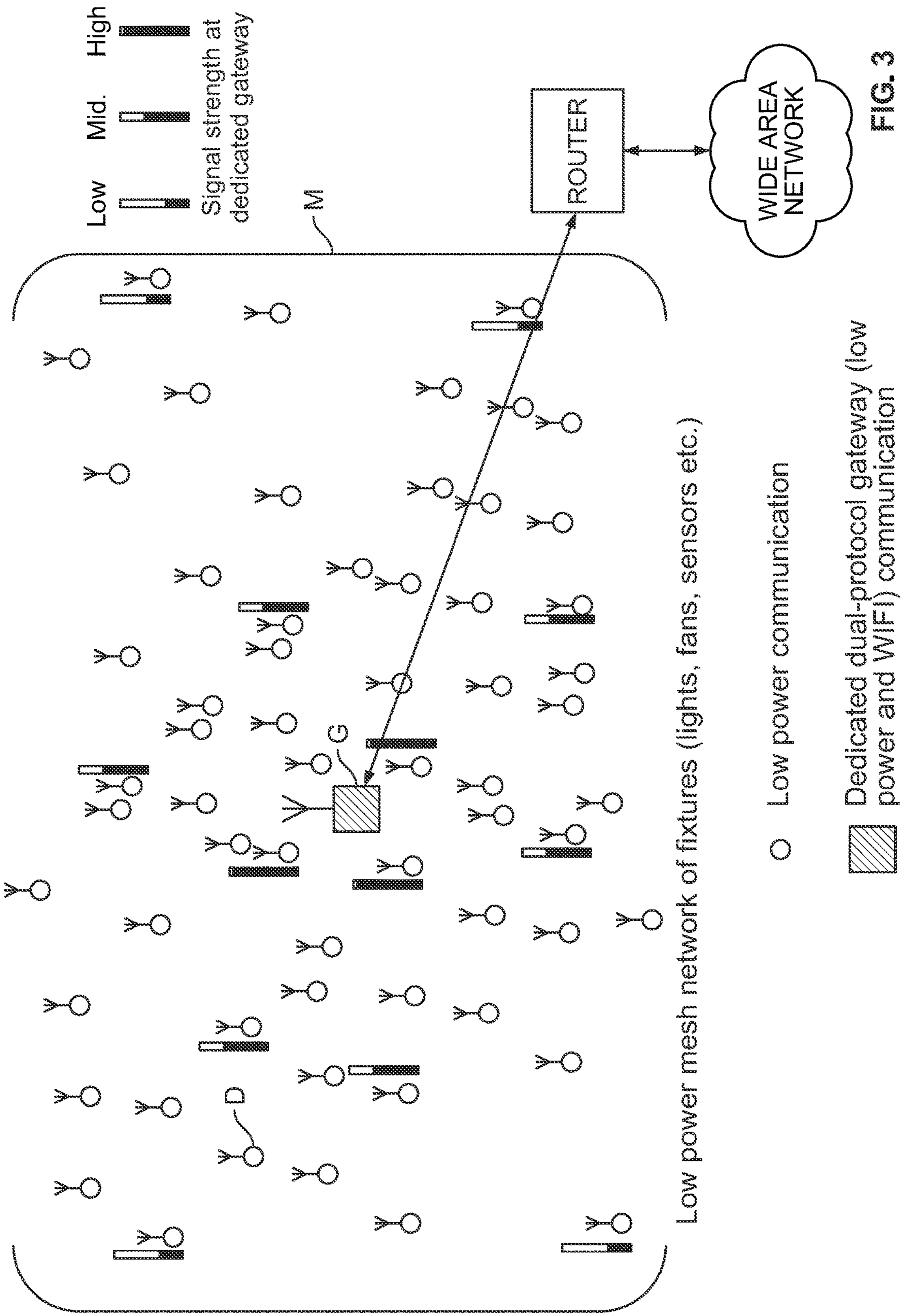
FIG. 3 (Prior Art)
FIG. 3 shows a typical prior art architecture.
Figure 4:
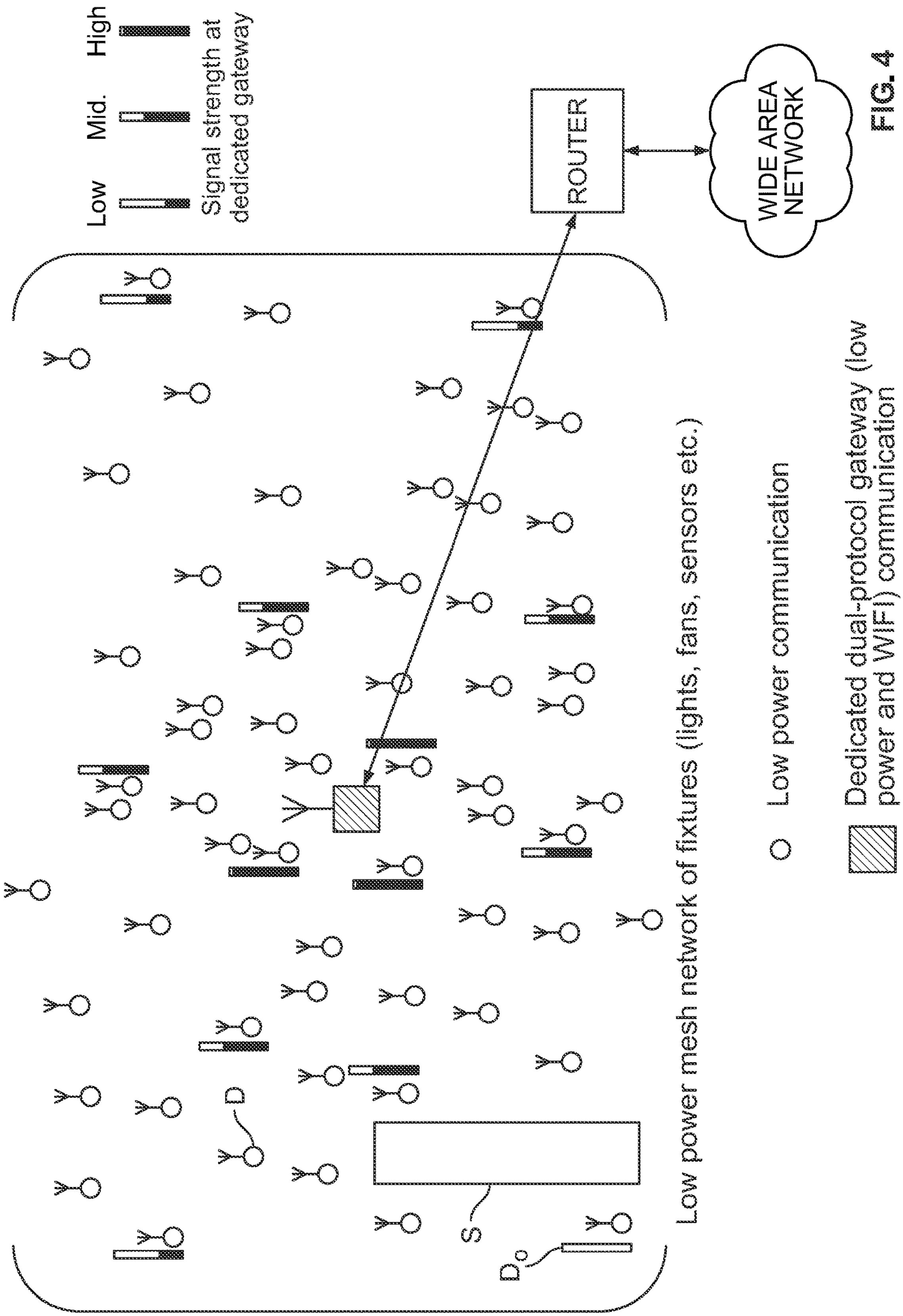
FIG. 4 (Prior Art)
FIG. 4 shows a typical prior art architecture.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for controlling a fixture are provided. The apparatus and methods may enable mesh communication without a dedicated gateway. A mesh may include a low power mesh. The mesh may be a network. The network may include nodes. A node may include an end device. The end device may be a fixture.

The fixture may include a light source. The fixture may include a fan. The fixture may include a sensor. The fixture may include any suitable device.

The light fixture may be configured to be turned on and off. The light fixture may be configured to be dimmed. The fan may be configured to be set to different fan speeds. The sensor may be configured to measure temperature, humidity, motion, or any other suitable measurable value.

The fixture may include a circuit. The circuit may include a microcontroller. The circuit may include machine-readable memory. The circuit may include a radio. The circuit may include any other suitable component. The microcontroller may be included in a chip. The chip may be a chip such as that available under the tradename Espressif ESP32 Series of Modules (e.g., those available under the tradenames ROVER and ROOM) from Espressif Systems, located in Shanghai, China. The chip may have both Wi-Fi and Bluetooth modules. The chip may be any suitable chip. The radio may be configured to transmit and receive using one, two or more different protocols. The radio may include a transceiver. The radio may be configured to transmit Wi-Fi and Bluetooth signals. The radio may be configured to receive Wi-Fi and Bluetooth signals.

The circuit may have a processor. The circuit may include memory. Different circuits in a mesh may have different processors. Different circuits in a mesh may have different memory. Different processors may have different processing speed. Different processors may have different processing capabilities. Different memories may have different capacities.

The circuit may be powered by a battery. The battery may be a battery such as that available from Victagen (www.victagen.com) as Model No. IMP 18650.

The circuit may include a memory. Table 1 lists illustrative information that may be stored in the memory.

TABLE 1

| Illustrative information that may be stored in the memory: |
|---|
| Radio protocol encoding and decoding information |
| Network fixture IDs |
| Network fixture specifications |
| Network fixture locations |
| Network management task data |
| Fixture control instructions |
| Any other suitable information |

The microcontroller may be configured to execute a fixture control function. Table 2 lists illustrative fixture control functions.

TABLE 2

| Illustrative fixture control functions: |
|---|
| Adjusting brightness of a light source |
| Adjusting color of a light source |
| Mixing colors of a light source |
| Setting an ON/OFF state of a fan |
| Setting the speed of a fan |
| Controlling a setting of a sensor |
| Adjusting a parameter of a sensor |
| Any other suitable fixture control function |

The microcontroller may be configured to execute an IoT ("Internet of Things") network management task. Table 3 lists illustrative IoT network management tasks.

TABLE 3

| Illustrative IoT network management tasks.: |
|---|
| Transmit a Wi-Fi message |
| Receive a Wi-Fi message |
| Transmit fixture control information to a fixture |
| Designate fixtures as a multi-protocol gateway |
| Transmit data |
| Route data |
| Test Status |
| Handle errors |
| Redundancy status |
| Delegate tasks |
| Scheduling or execution of automations. |
| Connecting with or communicating with cloud-based infrastructure. |
| Connecting with or communicating with $3^{rd}$ party control systems (e.g., Control4, Lutron, Savant, etc.). |
| Live monitoring of overall resources available and assigning tasks based on availability of node or reliability of node. |
| Determining task usage of node based on whether it is battery powered or wired. |
| Processing of a firmware or software update. |
| Preparing firmware or software for distribution among the nodes. |
| Handling or storing locally a user defined schedule. |
| Determining an order of priority in applying batch updates to optimize for end user experience or apply during scheduled downtime. |
| Splitting tasks based on type of device such as fan, lights, landscape light. |
| Assigning default backup task nodes in the event of a failure of main nominated node and a subsequent failure to nominate a new main node. |
| Any other suitable IoT network management task |

A task may be assigned by a user. A task may be assigned by a home network. A task may be assigned by a remote platform. A task may be assigned by a rule resident in a fixture. User assignment of a task may facilitate testing of node, fixture or mesh performance.

A fixture may have mesh radio functionality. A fixture may have Wi-Fi radio functionality. A fixture may have both mesh radio functionality and Wi-Fi functionality. Mesh radio functionality may be a low power radio functionality. A fixture may include a transmitter. A fixture may include a receiver. A fixture may include a transceiver. A fixture may include a single physical transceiver. The physical transceiver may communicate based on a mesh protocol. The physical transceiver may communicate based on a Wi-Fi protocol. The physical transceiver may communicate based on a mesh protocol and a Wi-Fi protocol. The mesh protocol may be a low power mesh protocol.

Fixture to fixture communication may be via a mesh such as a mesh conforming to Bluetooth Low Energy ("BLE") protocol.

The fixture may be part of an IoT network. The IoT network may include a plurality of one or more fixtures. The IoT network may be an IoT network that does not include a dedicated multi-protocol gateway. Examples of dedicated gateways include gateways such as those available under the tradenames Arlo Bridge from Arlo, Smart Lighting Bridge from Ring, Hue Personal Wireless Lighting Bridge from Phillips, or any other dedicated gateway.

The network may be decentralized. When a fixture joins a home network (e.g., a Low Power Mesh or any other suitable home network) it may connect to a home Internet (IP) network. It may be that the fixture may not connect to any external or third-party system until one or more of the fixture control functions within the mesh are determined.

A user may commission a fixture to the mesh. A home network may commission a fixture to the mesh. A remote platform may commission a fixture to the mesh.

Fixtures may be commissioned to the mesh via an application. The application may be instanced on a computing platform. The platform may include a mobile communication device such as a tablet, phone, or the like. The platform may include a personal computer, a remote host, or the like.

After commissioning of a fixture, the fixture may notify the remainder of the mesh of its membership in the mesh as well as its assigned tasks. The home network may renegotiate which tasks are assigned to which fixtures. The renegotiation may be based on one or more of the aforementioned considerations.

The network may periodically determine if a fixture has become incapable of performing a task assigned to the fixture. The network may reassign the task role to a different fixture. The reassignment may involve renegotiation.

One or more of the fixtures may be designated as a multi-protocol gateway for the IoT network.

The designated multi-protocol gateway may be configured to communicate using a first protocol and a second protocol. The first protocol may be an IoT network protocol. The first protocol may be a mesh protocol. The IoT network protocol may be a Bluetooth protocol. The first protocol may be an IEEE 802.15 standard protocol or any other suitable protocol. The first protocol may be configured for use for communications among the fixtures within the network. The second protocol may be a Wi-Fi protocol. The Wi-Fi protocol may be configured for use between the designated multi-protocol gateway and a router. The second protocol may be a TCP/IP protocol. The second protocol may be an IEEE 802.11 standard protocol or any other suitable protocol. The router may be connected to a wide area network (WAN). The wide area network may be the Internet.

The designated multi-protocol gateway may be configured to receive firmware updates from a location on the Internet. The designated multi-protocol gateway may be configured to receive the updates using the Wi-Fi protocol. The designated multi-protocol gateway may send the updates to the other fixtures included in the IoT network. The designated multi-protocol gateway may send the updates via the Bluetooth protocol.

Fixtures may arbitrate amongst themselves based on their ability to fulfill an administrative role. The arbitration may be based on Wi-Fi signal strength, CPU load, CPU power, memory available, device type or any other suitable consideration.

The IoT network may not have an exclusive multi-protocol gateway. The IoT network may not have a permanent multi-protocol gateway. Any of the one or more fixtures included in the IoT network may be designated as the designated multi-protocol gateway. The designated multi-protocol gateway may communicate using the first protocol and the second protocol.

Any of the one or more fixtures included in the IoT network may not be designated as a multi-protocol gateway. The fixtures that are not designated as a multi-protocol gateway may communicate using the first protocol and not the second protocol. The fixtures not designated as a multi-protocol gateway may not process data as part of the second protocol. The fixtures not designated as a multi-protocol gateway may communicate using a Bluetooth signal, not using a Wi-Fi signal. The fixtures not designated as multi-protocol gateways may turn off Wi-Fi signal capability.

A first fixture may send a message to a selected fixture. The first fixture may be designated as the multi-protocol gateway. The selected fixture may not be a designated multi-protocol gateway. The selected fixture may have a first signal-strength. The first signal-strength may be a low-signal strength. The designated multi-protocol gateway may create a direct communication path of non-designated multi-protocol gateway fixtures. The communication path may contain any number of fixtures. The fixtures may have a second signal-strength. The second signal-strength may be higher than the first signal strength. The designated multi-protocol gateway may transmit a message to the selected fixture via the communication path.

A first fixture may identify a low-strength-signal fixture within the IoT network. The first fixture may want to transmit a message to the low-strength-signal fixture. The first fixture may identify a second fixture. The second fixture may be disposed closer to the low-strength-signal fixture than the first fixture. The first fixture may designate the second fixture as the designated multi-protocol gateway. The first fixture may transfer responsibility for communication with the low-strength-signal fixture to the second fixture.

A first fixture may have an internal operational power level. The internal operational power level may be determined based on the operating capacity of the microcontroller included in the first fixture. When the operational power level decreases below a threshold, the first fixture may pass gateway responsibility to a second fixture. The second fixture may have an operational power level that is higher than the threshold. The threshold may be determined by a minimum amount of power necessary to compute tasks necessary for a multi-protocol gateway. The operational power level may need to be high enough to perform Bluetooth communication and Wi-Fi communication. The operational power level may need to be high enough to perform fixture-control functions and IoT network management tasks.

A first fixture may designate a second fixture to be the designated multi-protocol gateway. The IoT network may have a first and second designated multi-protocol gateway. There may be more than one designated multi-protocol gateway within an IoT network.

The microcontroller included in the fixture may have a processing capacity. The microcontroller may be configured to estimate a processing requirement. The processing requirement may be an amount of processing capacity necessary to complete a control-function or an IoT management task. The fixture may be a first fixture. The first fixture may be a designated multi-protocol gateway. The fixture may be configured to delegate an IoT management task to a delegee fixture if the processing requirement exceeds the processing capacity. The fixture may delegate some of its IoT management tasks to the delegee fixture. The fixture may delegate all its IoT management tasks to the delegee fixture.

The delegee fixture may be a first delegee fixture. The IoT management task may be a first IoT management task. The fixture may further be configured to delegate a second IoT management task. The fixture may delegate the second IoT management task to a second delegee fixture.

A first fixture may be further configured to assign a cluster. The cluster may be comprised of the first and second delegee fixtures. The cluster may be defined by any number of delegee fixtures. The first fixture may appoint the first delegee fixture as the head of the cluster. The first fixture may delegate a first and second IoT management task to the head of the cluster. The first fixture may delegate any number of IoT management tasks to the head of the cluster. The head of the cluster may delegate the delegated tasks to all the delegee fixtures included in the cluster.

The designated multi-protocol gateway may be configured to send an IoT network task to a low-signal fixture. The designated multi-protocol gateway may transmit the task by routing the task through a most trafficked fixture. The most trafficked fixture may be the most trafficked fixture of the IoT network. The most trafficked fixture may be the fixture that has the most communication. The most trafficked fixture may transmit the task to the low-signal fixture.

The most trafficked fixture may be identified by using artificial intelligence.

The designated multi-protocol gateway may be configured to divide the IoT network into zones. The zones may be divided based on signal-strength of the fixtures. The zones may be divided by physical location of the fixtures. The zones may be divided based on operating capacity levels of the fixtures. The zones may be divided based on throughput levels of the fixtures. The zones may be divided using any other suitable dividing variable.

The designated multi-protocol gateway may assign one fixture in each zone as the primary fixture. The primary fixture may be the fixture that communicates directly with the designated multi-protocol gateway. The remaining fixtures in the zone may be secondary fixtures. The primary fixtures may be configured to multicast an IoT network management task to the secondary fixtures in the zone. Zoning the IoT network may minimize redundant chatter among the fixtures.

The multi-protocol gateway may be configured to receive over-the-air (OTA) updates. The OTA updates may be firmware updates. The OTA updates may be hardware updates. The OTA updates may be received with a Wi-Fi protocol. The multi-protocol gateway may be configured to send the OTA updates to other fixtures in the network. The OTA updates may be sent using a Bluetooth protocol.

The fixtures may be fixed to environmental structures.

The fixtures may be portable.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

All ranges and parameters disclosed herein shall be understood to encompass any and all subranges subsumed therein, every number between the endpoints, and the endpoints.

Figure 5:
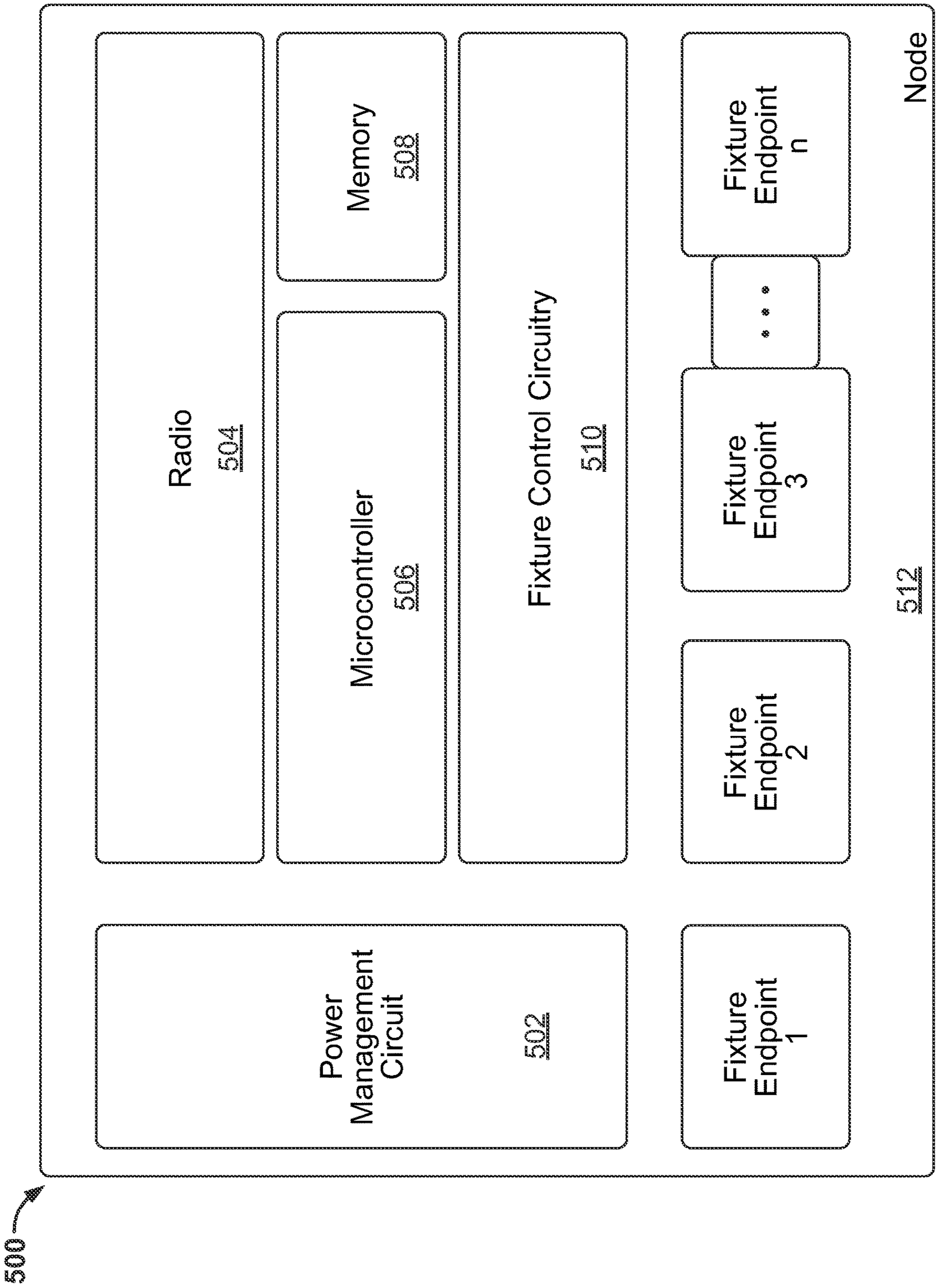
FIG. 5 shows a schematically illustrative apparatus in accordance with principles of the invention.

FIG. 5 shows illustrative circuit 500. Circuit 500 may be disposed in a fixture in an IoT network. Circuit 500 may provide the fixture with the ability to communicate with other fixtures in the network. Circuit 500 may control functions of the fixture.

Circuit 500 may include power management circuit 502. Power management circuit may include and may receive power from a battery, line power or any other suitable power. Circuit 500 may include radio 504. Radio 504 may include one or more of a transmitter, a receiver and a transceiver. Radio 504 may communicate with radios of other fixtures in the network. Intranetwork communication may involve Bluetooth or BTLE protocols. Radio 504 may communicate with a router. Communication with the router may involve Wi-Fi protocols, TCP/IP protocols or other suitable protocols.

Circuit 500 may include microcontroller 506. Microcontroller 506 may control fixture functions. Microcontroller 506 may process network management tasks.

Circuit 500 may include memory 508.

Circuit 500 may include fixture control circuitry 510. Fixture control circuitry 510 may be configured to receive a fixture performance signal from microcontroller 506. Circuitry 510 may be configured to translate the fixture performance signal into a low-voltage signal that will cause a fixture to perform a task. The low-voltage signal may be a pulse-width modulated ("PWM") signal.

Circuit 500 may deliver the low-voltage signal to one or more of fixture endpoints 512. Each of fixture endpoints 512 may be coupled to a device in the fixture such as a fan or a light.

Figure 6:
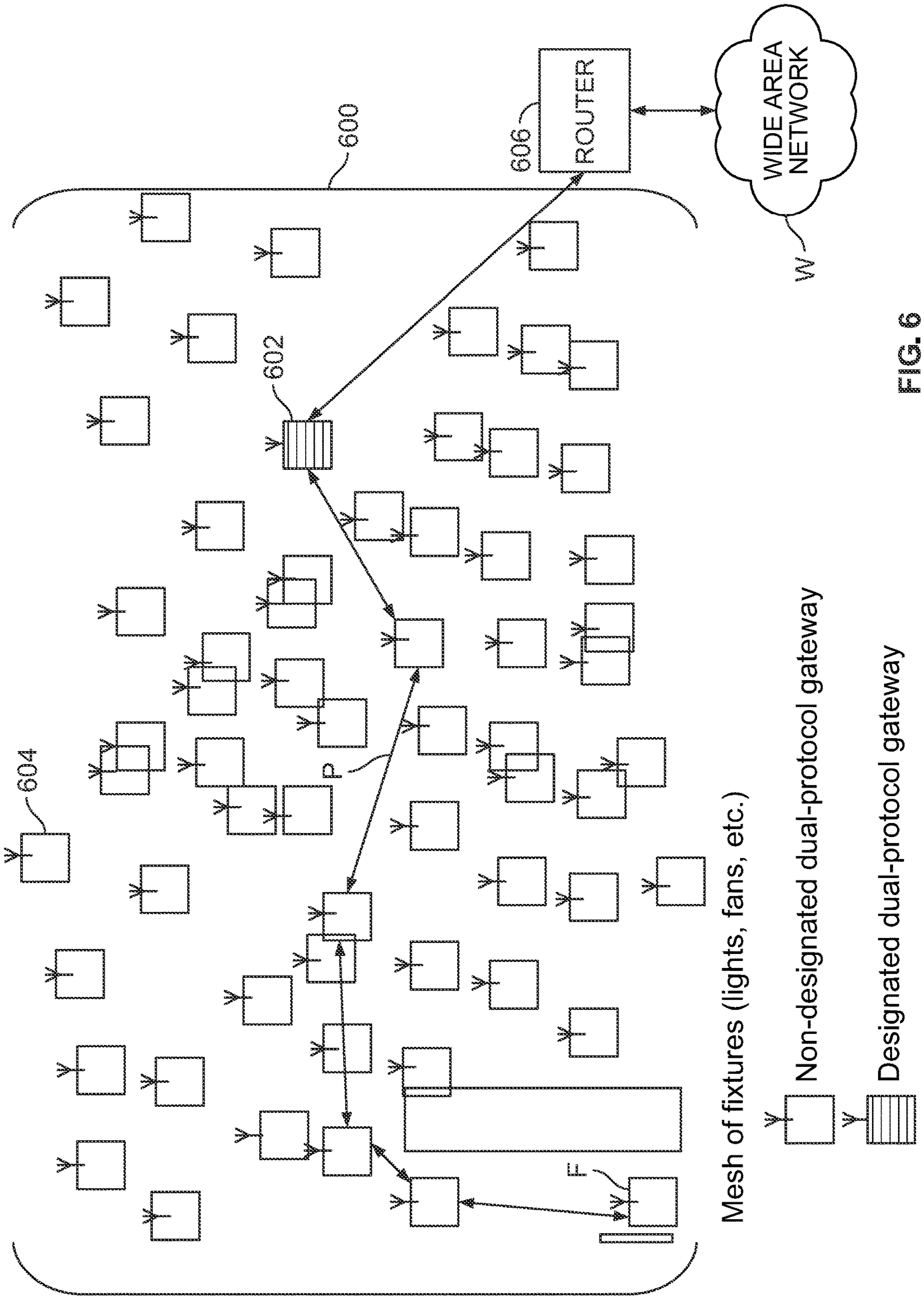
FIG. 6 shows schematically an illustrative architecture in accordance with principles of the invention.

FIG. 6 shows illustrative IoT network 600. Network 600 may include fixtures such as fixture 602. Network 600 may include fixtures such as fixture 604. Fixtures 602 and 604 may include a circuit such as circuit 500.

Fixture 602 may be designated to act as a multi-protocol gateway. Fixtures 604 may communicate fixture control instructions and network management information with fixture 602. Fixtures 604 may be placed in a state in which Wi-Fi communication functions are asleep. This may conserve resources in fixtures 604. The conservation of resources may enable the fixtures to use resources for Wi-Fi communication for intra-network processing and communication. Fixture 602 may communicate fixture control instructions and network management information with wide area network W via router 606. Network W may include the Internet.

Fixture 602 may determine that fixture F is shielded by structure S. Fixture 602 may define a path P to circumvent structure S to communicate between fixtures 604 to establish communication with fixture F.

Figure 7:
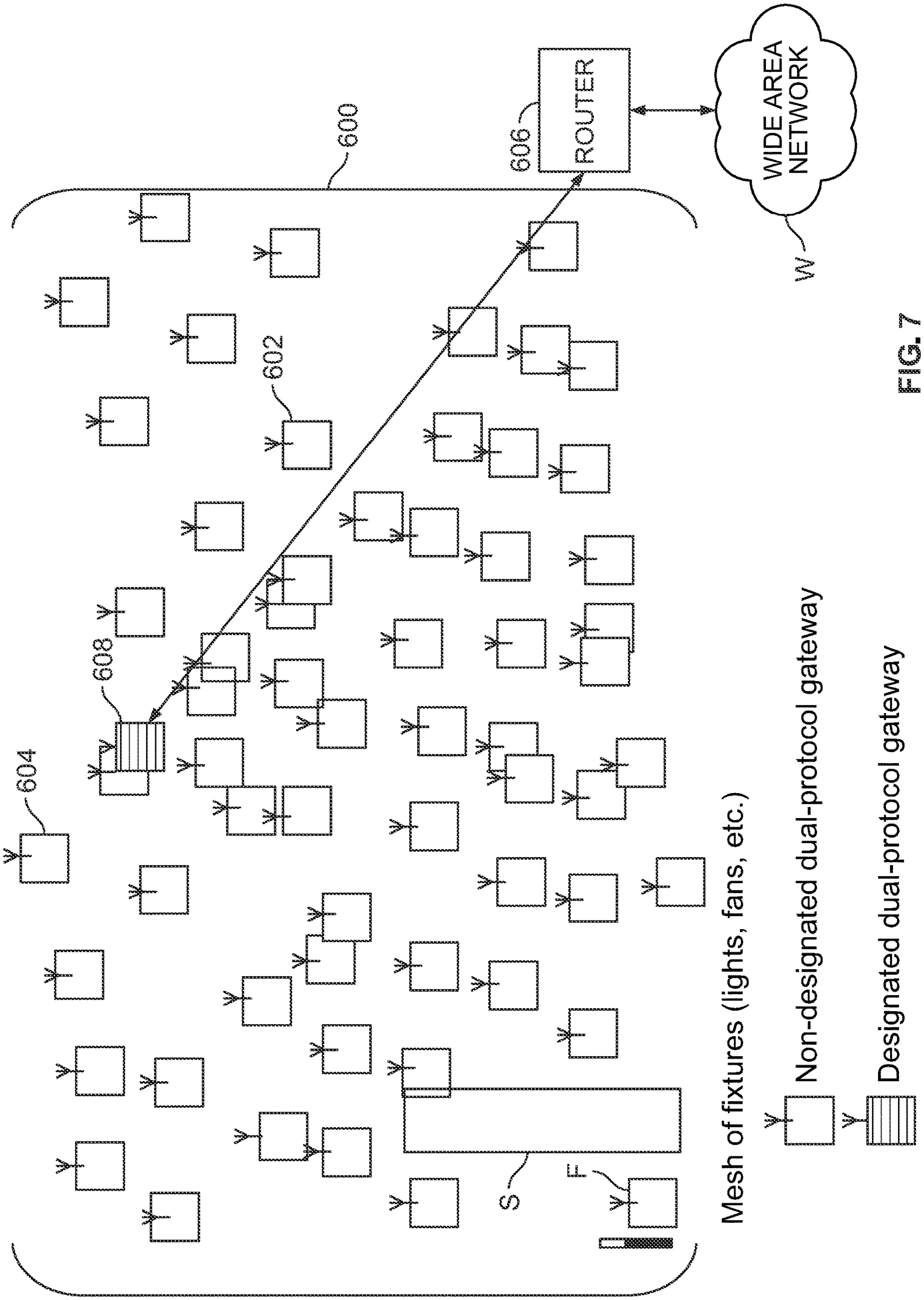
FIG. 7 shows schematically an illustrative architecture in accordance with principles of the invention.

FIG. 7 shows that fixture 602 may designate fixture 608 as a new designated multi-protocol gateway. Fixture 608 may be situated relative to structure S and fixture F such that the signal strength of fixture F as measured at the designated fixture is strong enough for direct communication without defining and routing along a path such as path P.

Figure 8:
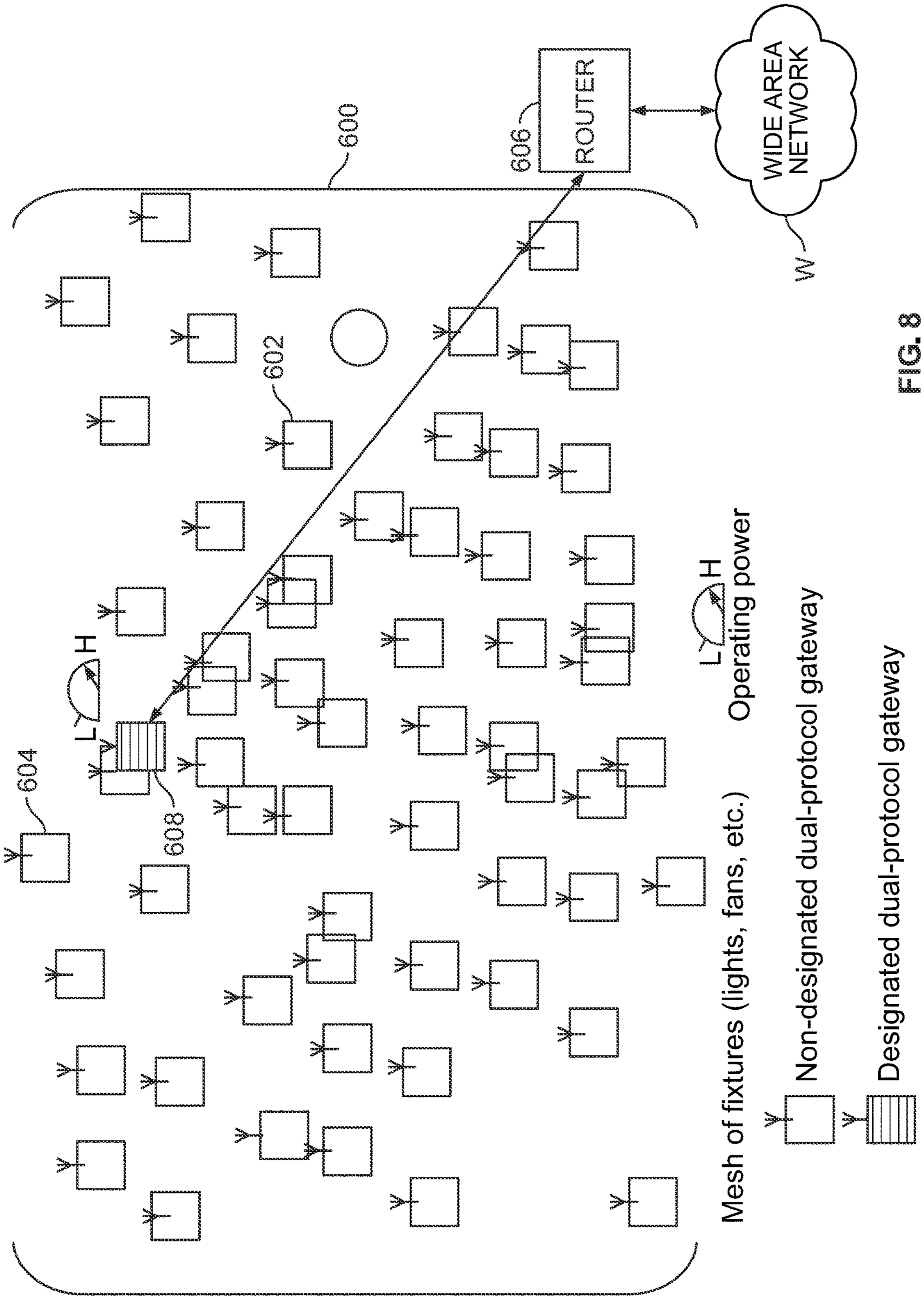
FIG. 8 shows schematically illustrative architecture in accordance with principles of the invention.

FIG. 8 shows that fixture 608 may monitor its operating power level. The power level may be HIGH.

Figure 9:
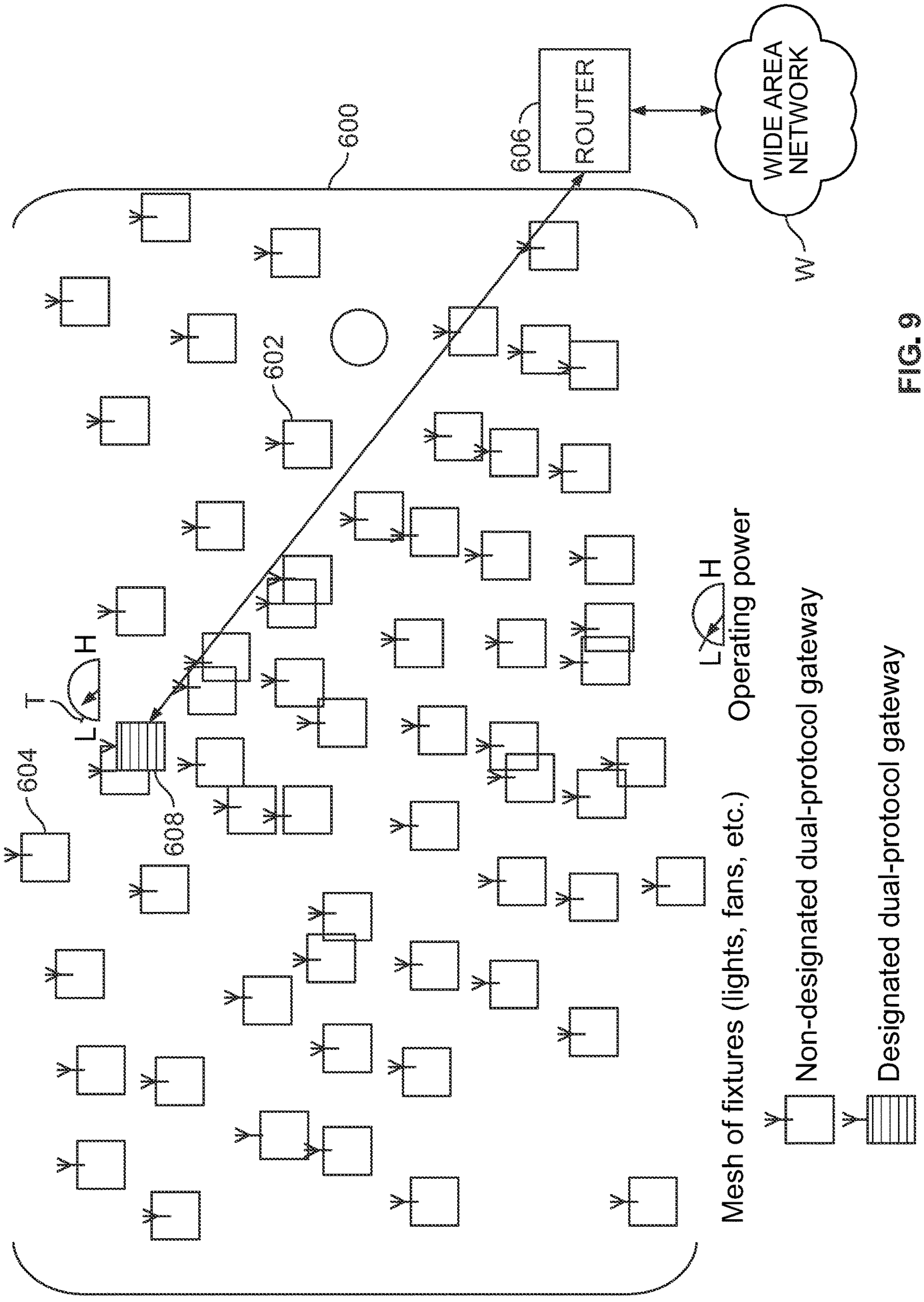
FIG. 9 shows schematically an illustrative architecture in accordance with principles of the invention.

FIG. 9 shows that after operating for a period of time, the operating power level may decrease. The operating power level may cross threshold T.

Figure 10:
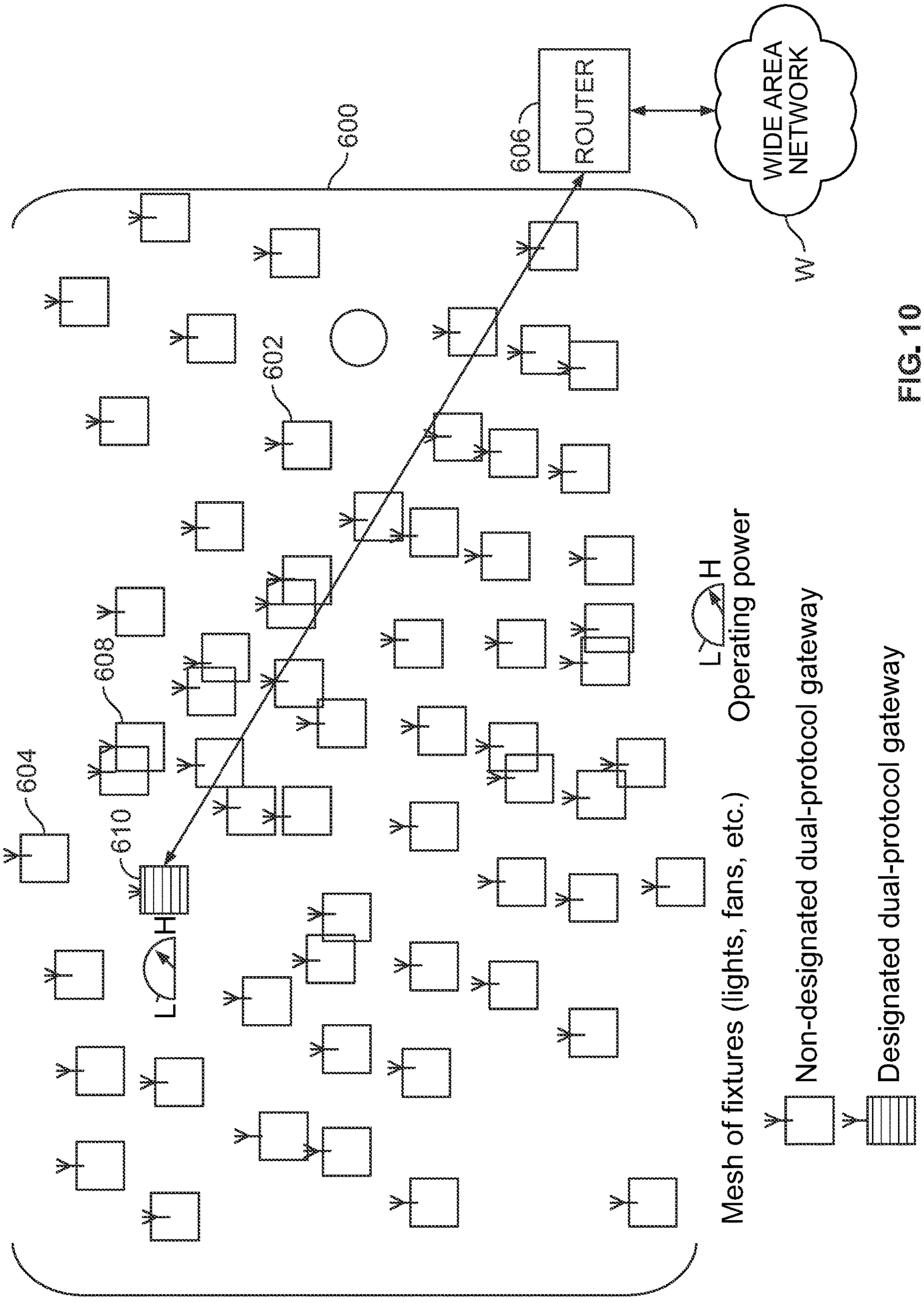
FIG. 10 shows schematically an illustrative architecture in accordance with principles of the invention.

FIG. 10 shows that fixture 608 may identify fixture 610 as having a higher operational power level. Fixture 608 may designate fixture 610 to operate as the designated multi-protocol gateway.

Figure 11:
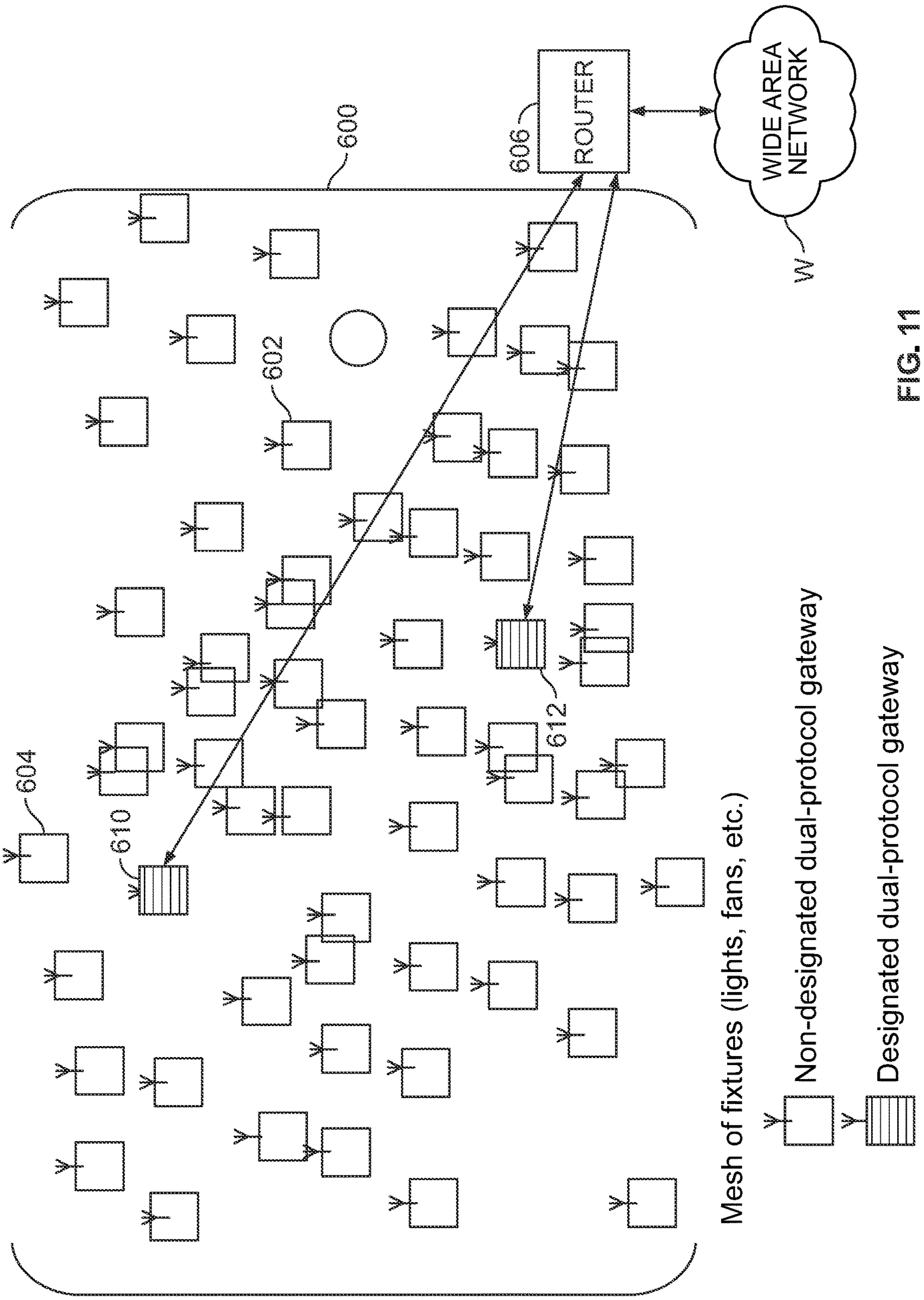
FIG. 11 shows schematically an illustrative architecture in accordance with principles of the invention.

FIG. 11 shows that fixture 610 may designate fixture 612 to be a second designated multi-protocol gateway. This may provide redundancy in the even of an emergency condition that may cause one of the multi-protocol gateways to stop operating.

Figure 12:
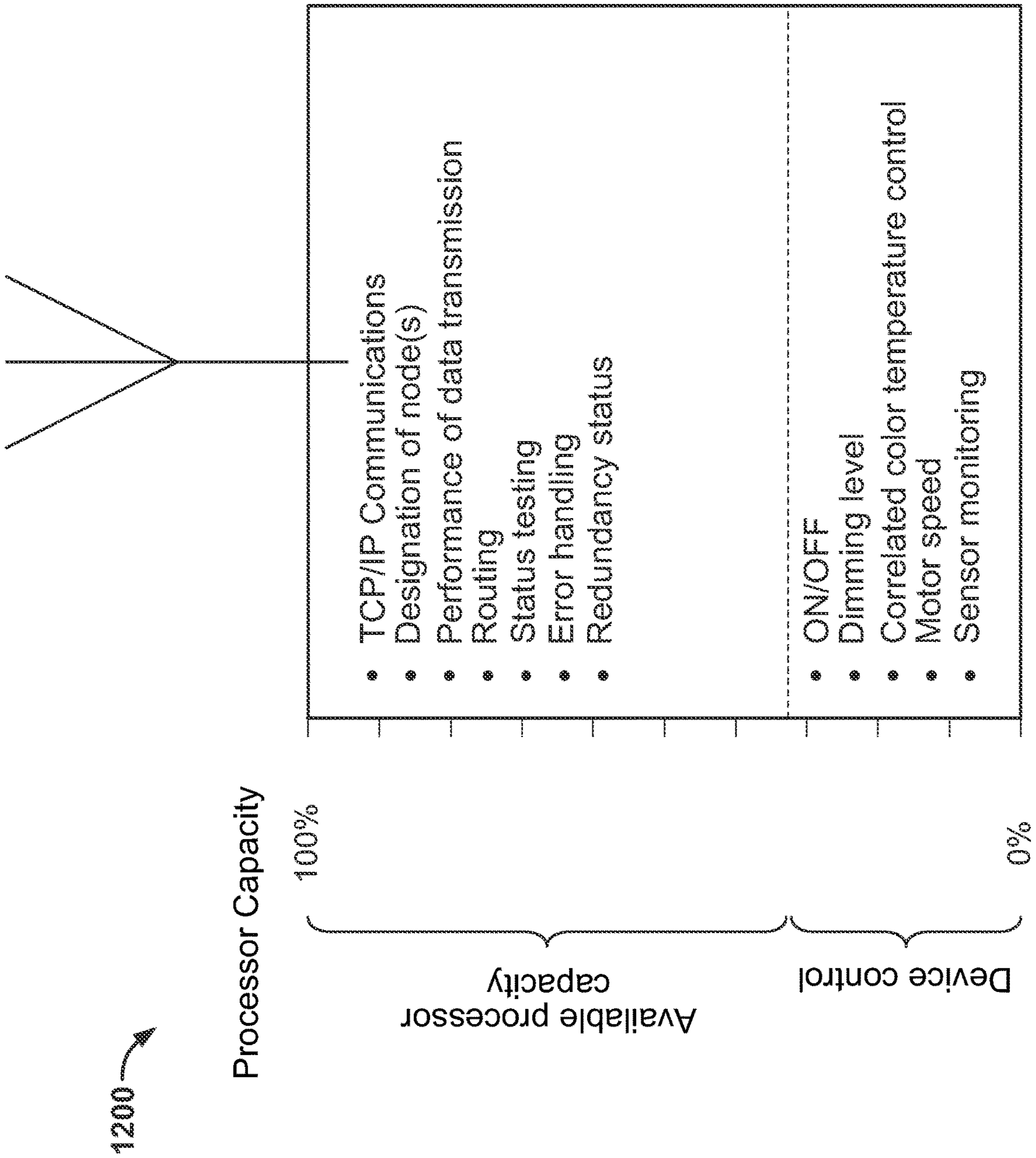
FIG. 12 shows illustrative information about apparatus in accordance with principles of the invention.

FIG. 12 shows allocation 1200 of processor capacity of a fixture in network 600. A first fraction of the capacity is used for controlling fixture operation ("Device Control"). A second fraction of the capacity is available processor capacity. Available processor capacity may be used for network management tasks. The tasks may be performed using low power communication. The tasks may be performed using Wi-Fi communication. If the fixture is in a non-designated state, the Wi-Fi functionality may be set to dormant, sleep or inactive status. This may make more processing capacity available for other network management tasks.

Figure 13:
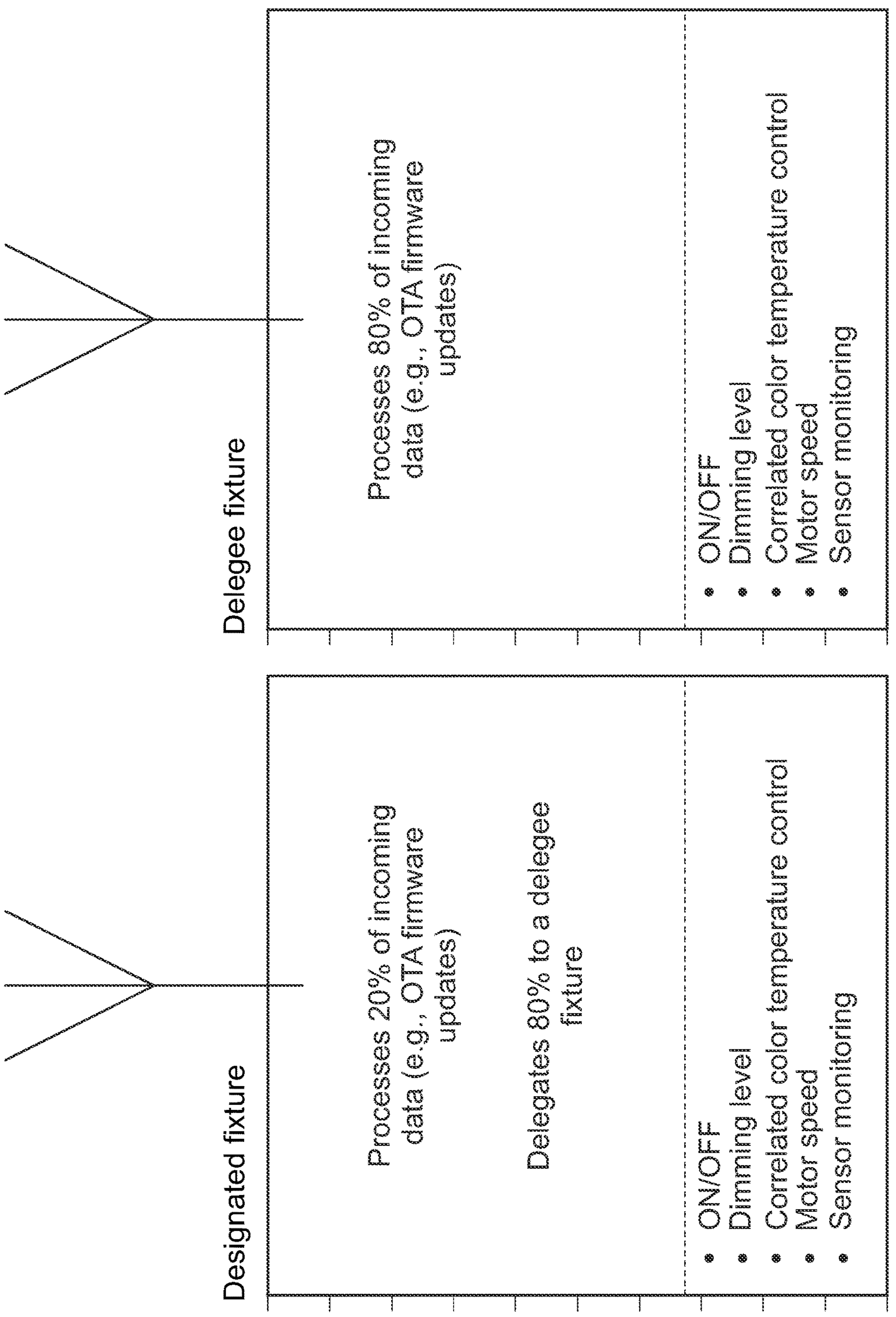
FIG. 13 shows illustrative information about apparatus in accordance with principles of the invention.

FIG. 13 shows that a designated fixture may process a fraction (e.g., 20%) of incoming data. The designated fixture may delegate the remaining 90% to a delegee fixture, which may have more processing capacity available, because it is not responsible for communicating with the router.

Figure 14:
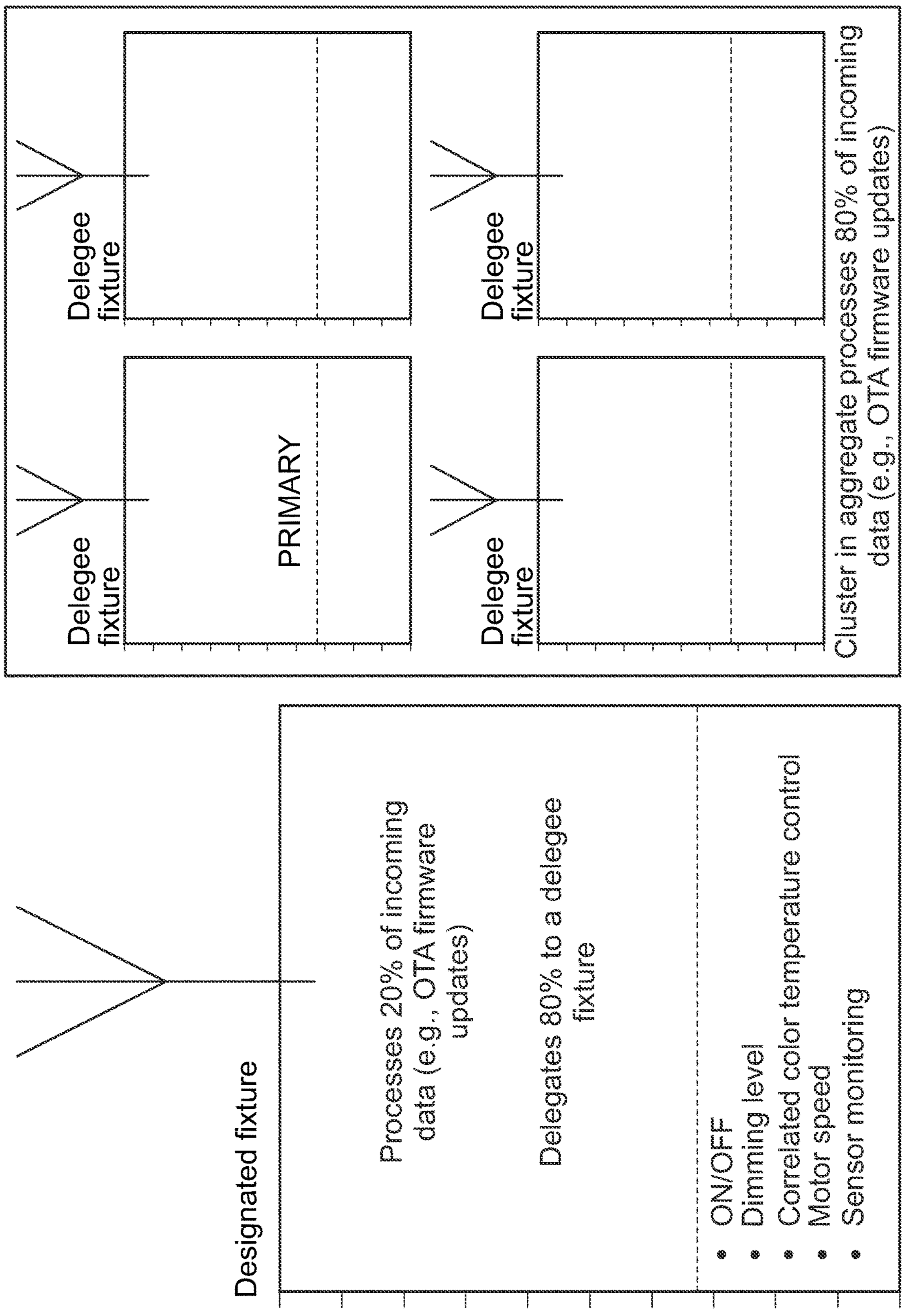
FIG. 14 shows illustrative information about apparatus in accordance with principles of the invention.

FIG. 14 shows that the designated fixture may process a fraction (e.g., 20%) of incoming data. The designated fixture may establish a cluster of delegee fixtures. The designated fixture may delegate 80% of the processing to the cluster. The cluster may have a primary fixture. The designated fixture may route tasks directly to the primary fixture. The primary fixture may allocate the tasks to the other fixtures in the cluster.

Figure 15:
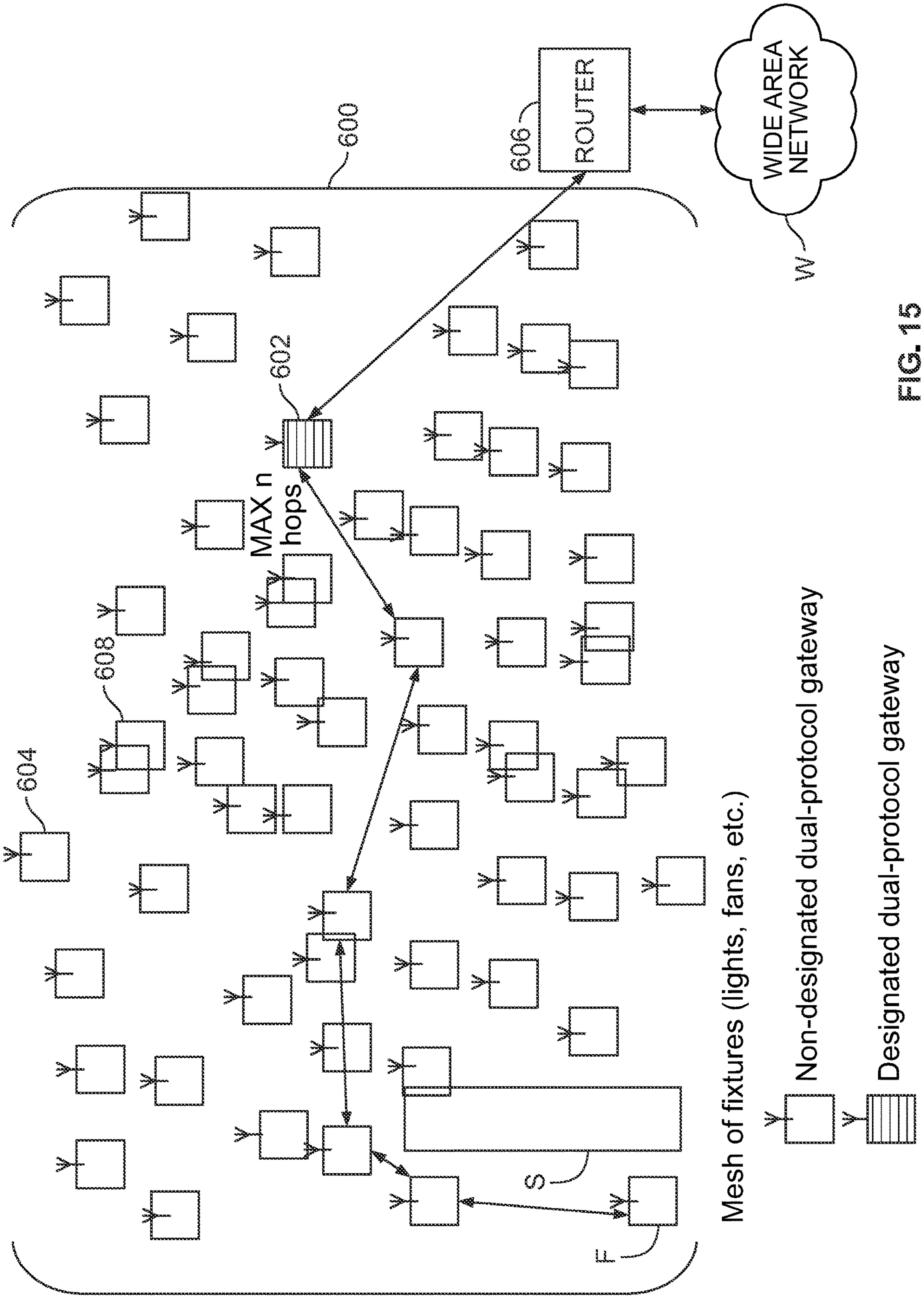
FIG. 15 shows schematically an illustrative architecture in accordance with principles of the invention.

FIG. 15 shows that designated multi-protocol fixture 602 may transmit a signal that is subject to a limited number of hops ("MAX n hops") between fixtures. This may limit the number of duplicative signals that are received by fixtures in the network. If the MAX n hops is large enough, the signal will travel to the edge of the network (e.g., to fixture F). If the MAX n hops is small enough, it will reduce the number of duplicate signals that fixture F receives.

Figure 16:
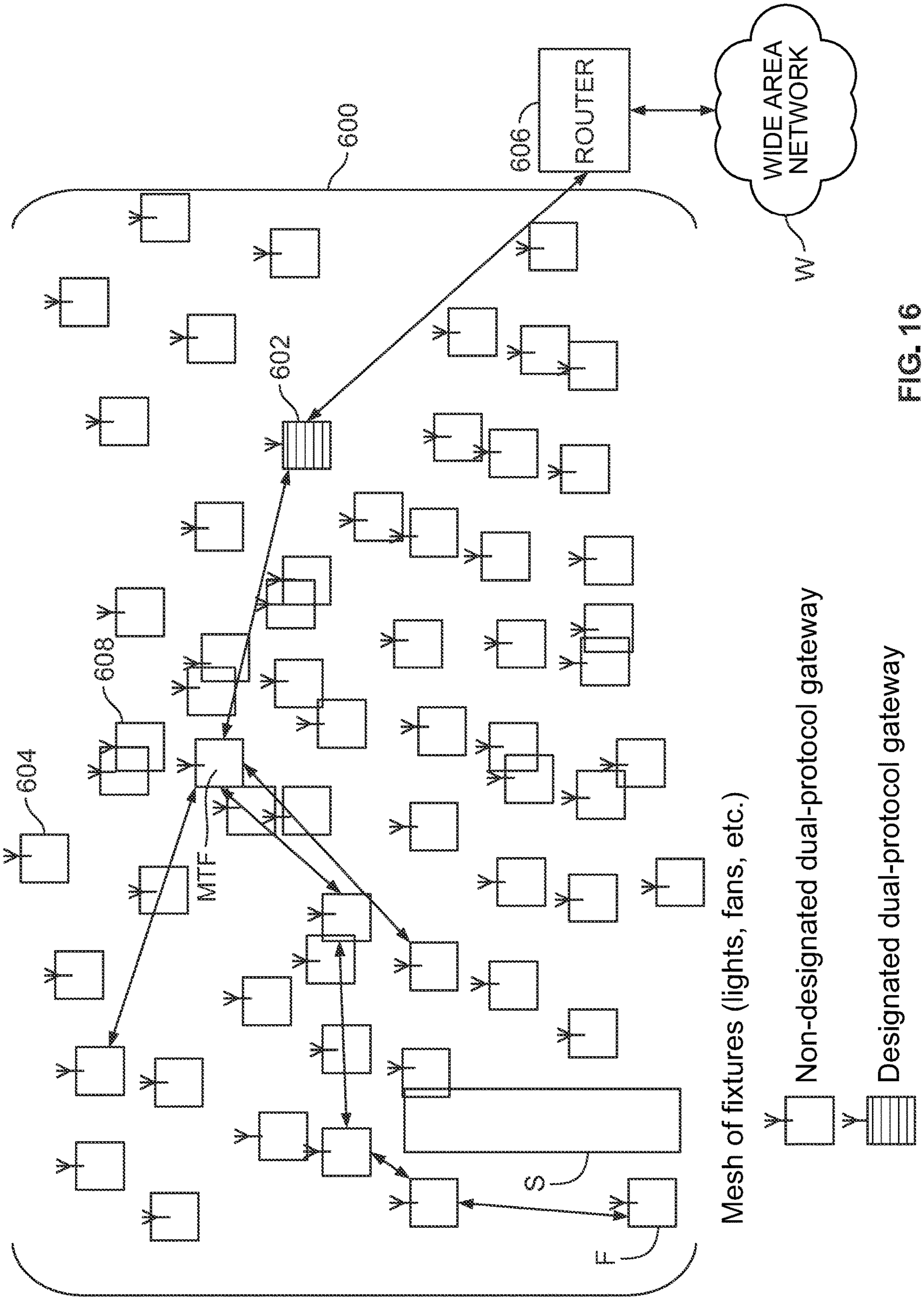
FIG. 16 shows schematically an illustrative architecture in accordance with principles of the invention.

FIG. 16 shows that designated multi-protocol fixture 602 may identify a most-trafficked fixture ("MTF"). Fixture 602 may directly route a signal to the MTF transmit a signal with an instruction for the MTF to multicast or broadcast the signal. This may help fixture 602 reach a fixture such as F with reduced duplication.

Figure 17:
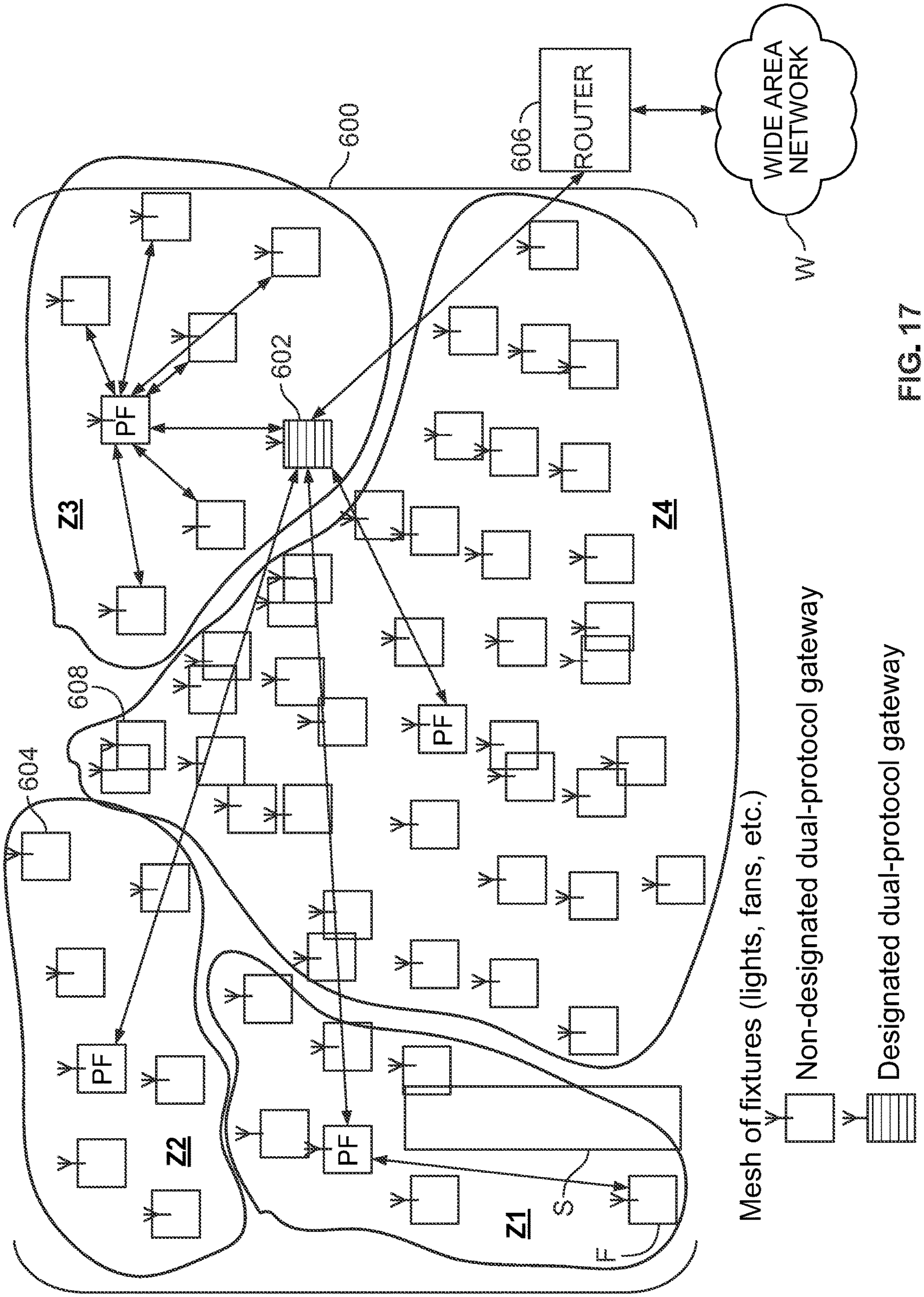
FIG. 17 shows schematically an illustrative architecture in accordance with principles of the invention.

FIG. 17 shows that designated multi-protocol fixture 602 may define zones such as Z1, Z2, Z3 and Z4 over network 600. Fixture 602 may appoint for each of the zones a primary fixture PF. Fixture 602 may communicate network management signals to the primary fixtures. The primary fixtures may distribute the signals with their respective zones.

Figure 18:
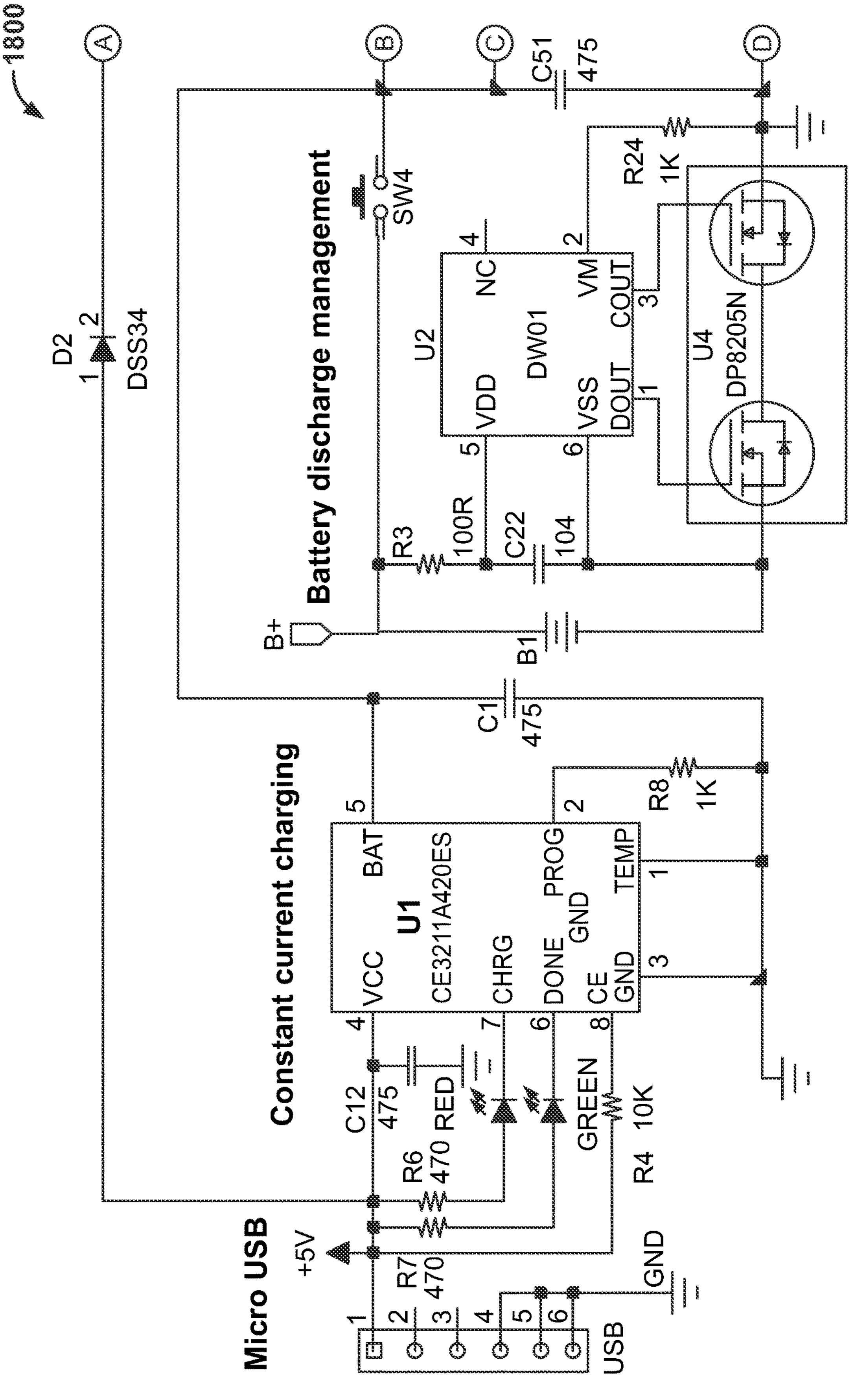
FIG. 18 (on four sheets) shows schematically illustrative apparatus in accordance with principles of the invention.

FIG. 18 shows illustrative circuit 1800 that may correspond to circuit 500. Table 4 shows illustrative parts that may be associated with circuit 1800.

TABLE 4

Illustrative parts that may be associated with circuit 1800.

| Part description | Tag |
|---|---|
| Double-sided PCB FR4 81*50*1.2 mm 1*2 panel RoHS | |
| SMD IC CE3211A420ES SO-8 RoHS | U1 |
| SMD IC DPDW01 SOT23-6 RoHS | U2 |
| SMD IC CE8313 SOT23-6 RoHS | U3 |
| SMD IC DP8205N SOT23-6 RoHS | U4 |
| SMD regulator IC, LD1117A, 3.3 V, SOT-89 | U6 |
| WI-FI module ESP32-WROVER-E (IPEX)8MFLASH + 8MRAM | U5 |
| Tact switch _12VDC/50 mA | SW1, SW2, SW3 |
| Chip IC AP0809ES3-s SOT-23 | Q1 |
| SMD Schottky diode 3 A/40 V DSS34 SOD-123FL | D1 |
| The wavelength of the 0603 red LED is 625 ± 5 nm | RED |
| Hongya 0603 blue LED wavelength 465 ± 5 nm | GREEN |
| SMD inductor 47 uH ± 20% 2.5 A 7*6.6*3.8 mm | L1 |
| Micro USB 5PIN horizontal crimped patch | USB |
| ⅛ W SMD Resistor, 160 Ω ± 1% (0805) | R21 |
| ⅛ W SMD Resistor, 300 Ω ± 1% (0805) | R22, R23 |
| 1/10 W SMD Resistor, 10 KΩ ± 1% (0603) | R1, R4, R13, R14, R15, R19, R20 |
| 1/10 W SMD Resistor, 1K ± 1% (0603) | R8, R24 |
| 1/10 W SMD Resistor, 510 R ± 1% (0603) | R6, R7 |
| 1/10 W SMD Resistor, 100 Ω ± 1% (0603) | R3, R16, R17 |
| ¼ W SMD Resistor, 4.7K ± 1% (1206) | R5 |
| 1/10 W SMD Resistor, 100 KΩ ± 5% (0603) | R10 |
| 1/10 W SMD Resistor, 15 KΩ ± 1% (0603) | R12 |
| 1/10 W SMD Resistor, 200 KΩ ± 1% (0603) | R11 |
| 1/10 W SMD Resistor, 4.7 KΩ ± 1% (0603) | R18 |
| X7R SMD capacitance 10 uF/10 V, ±10%, 125° C.(0805) | C5, C7 |
| X7R SMD Capacitance 0.1 uF/25 V, ±10%, 125° C.(0603) | C2, C8, C9, C10, C11 |
| X7R chip capacitor 4.7 UF/50 V ± 10% 1206 | C12, C1 |
| 3528 red LED wavelength 625 ± 5 nm | LED1 |
| 3528 green LED wavelength 465 ± 5 nm | LED2 |
| 3528 blue LED wavelength 465 ± 5 nm | LED3 |
| SMD components | |
| 3PIN Insert Pin 2.54*6 H = 11.5 Male Black | J4 |
| 2PIN plug-in pin header 2.54*6 H = 11.5 male black | J1 |
| Two-speed toggle switch, SW/DP2T | SW4 |
| Electrolytic capacitor 47 uF/25 V ± 20% 105° C. Φ5*11 12.7 hole pitch taping | EC1 |
| 18650 battery | BT |

Thus, methods and apparatus for controlling a fixture have been provided. Persons skilled in the art will appreciate that the present invention may be practiced by other than the described embodiments, which are presented for purposes of illustration rather than of limitation.

What is claimed is:

1. Apparatus for controlling an IoT network, the IoT network including a plurality of fixtures, each fixture configured to be designated as a gateway for the IoT network, the apparatus comprising:
- a circuit that:
  - includes:
    - a microcontroller;
    - machine readable memory; and
    - a transceiver; and
  - is included in a first fixture;
- wherein:
  - the first fixture is configured to:
    - be part of the IoT network;
    - act as a designated multi-protocol gateway for the IoT network; and
    - communicate using:
      - a first protocol; and
      - a second protocol that is different from the first protocol; and
  - the microcontroller is configured to execute:
- fixture-control functions that control an operation of fixtures;
- and
- IoT network management tasks;
- wherein the first fixture, when acting as the designated multi-protocol gateway, is configured to:
- select a second fixture from the plurality of fixtures; and
  - send a message to the second fixture, thereby causing the second fixture to act as the designated multi-protocol gateway for the IoT network.

2. The apparatus of claim 1 wherein the first protocol is an IoT network protocol.

3. The apparatus of claim 1 wherein the second protocol is a Wi-Fi protocol.

4. The apparatus of claim 1 wherein the first and second fixtures include a light fixture.

5. The apparatus of claim 1 wherein the first and second fixtures include fan.

6. The apparatus of claim 1 wherein the first and second fixtures include sensor.

7. The apparatus of claim 6 wherein the sensor is configured to measure temperature.

8. The apparatus of claim 6 wherein the sensor is configured to measure humidity.

9. The apparatus of claim 6 wherein the sensor is configured to sense motion.

10. The apparatus of claim 1 wherein the second fixture, acting as the designated multi-protocol gateway, is not an exclusive multi-protocol gateway.

11. The apparatus of claim 1 wherein the second fixture, acting as the designated multi-protocol gateway, is not a permanent gateway.

12. The apparatus of claim 1 wherein the first fixture is further configured such that, when the first fixture is not acting as the designated multi-protocol gateway, the first fixture is configured to:
- communicate with the first protocol; and
- not process data of the second protocol.

13. The apparatus of claim 1 wherein the second fixture, when caused to act as the designated multi-protocol gateway, is further configured to:
- create a direct communication path of non-designated multi-protocol gateway fixtures that leads to a selected fixture; and
- transmit a message along the direct communication path;

wherein:
- the selected fixture has a first signal strength measured at the second fixture;
- the fixtures have a second signal strength measured at the second fixture; and
- the second signal strength is higher than the first signal strength.

14. The apparatus of claim 1 wherein:
- the second fixture
  - is further configured such that, when caused to act as the designated multi-protocol gateway, the second fixture:
    - identifies:
      - a low-signal-strength fixture; and
      - a third fixture that is disposed closer to the low-signal-strength fixture than is the second fixture;
    - causes the third fixture to act as the designated multi-protocol gateway; and
    - transfers responsibility for communication with the low-signal-strength fixture to the third fixture.

15. The apparatus of claim 1 wherein:
- the second fixture:
  - is further configured such that, when the second fixture:
    - is caused to act as the designated multi-protocol gateway;
    - has an internal operational power level; and
    - the internal operational power level decreases below a threshold, the second fixture passes gateway responsibility to a third fixture.

16. The apparatus of claim 1 wherein the first fixture is configured to act as a second designated multi-protocol gateway when second fixture is caused to act as the designated multi-protocol gateway.

17. The apparatus of claim 1 wherein:
- the microcontroller:
  - has a processing capacity; and
  - is configured to estimate a processing requirement; and
- the second fixture
  - is further configured such that, when the processing requirement exceeds the processing capacity, the second fixture delegates an IoT network management task to a delegee fixture.

18. The apparatus of claim 17 wherein:
- the delegee fixture is a first delegee fixture;
- the IoT network management task is a first management task; and
- the second fixture is further configured to delegate a second management task to a second delegee fixture.

19. The apparatus of claim 18 wherein the second fixture is further configured to:
- assign to a cluster:
  - the first delegee fixture; and
  - the second delegee fixture;
- appoint the first delegee fixture as a head of the cluster; and
  - delegate the first and second management tasks to the cluster by transmission of an instruction to the head.

20. The apparatus of claim 1 the second fixture is further configured, when caused to act as the designated multi-protocol gateway, to send an IoT network management message to a low-signal fixture by routing the IoT network management message through a most-trafficked fixture in the IoT network.

21. The apparatus of claim 20 wherein the second fixture is further configured to identify the most-trafficked fixture using artificial intelligence.

22. The apparatus of claim 1 wherein the second fixture is further configured to:
- divide the IoT network into zones;
- assign one fixture in each zone to be a primary fixture, the remaining fixtures in the zone being defined as secondary fixtures; and
- set the primary fixture to multicast an IoT network management task to the secondary fixtures.

23. The apparatus of claim 22 wherein each zone is defined by a signal-level of the primary and secondary fixtures included in the zone.

24. The apparatus of claim 22 wherein each zone is defined by a throughput level of the primary and secondary fixtures included in the zone.

25. The apparatus of claim 22 wherein each zone is defined by a physical location of the primary and secondary fixtures included in the zone.

26. The apparatus of claim 1 wherein the designated multi-protocol gateway is configured to receive over-the-air updates.

27. The apparatus of claim 26 wherein the designated multi-protocol gateway is configured to send the over-the-air updates to other fixtures in the IoT network.

28. The apparatus of claim 1 wherein the first and second fixtures are configured to be fixed to an environmental structure.

29. The apparatus of claim 1 wherein the first and second fixtures are portable.

* * * * *